(12) United States Patent
Lee et al.

(10) Patent No.: US 8,892,524 B1
(45) Date of Patent: Nov. 18, 2014

(54) COLLECTION OF DATA FROM COLLABORATION PLATFORMS

(75) Inventors: Peter A. Lee, Pflugerville, TX (US); Satwik Hebbar, Chennai (IN); Jozsef Szalay, Austin, TX (US); Amir Jaibaji, Austin, TX (US); Keith T. Zoellner, Austin, TX (US); Dimitriy Blok, Austin, TX (US); Eric Scott, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/477,875

(22) Filed: May 22, 2012

(51) Int. Cl.
*G06F 17/00* (2006.01)
*G06F 17/30* (2006.01)

(52) U.S. Cl.
CPC ............... *G06F 17/30073* (2013.01)
USPC ............ 707/665; 707/667; 707/668

(58) Field of Classification Search
CPC .................................. G06F 17/30073
USPC .................. 707/661, 665, 668, 667; 715/234
See application file for complete search history.

(56) References Cited

U.S. PATENT DOCUMENTS

| | | | | |
|---|---|---|---|---|
| 6,778,971 B1 * | 8/2004 | Altschuler et al. | ............... | 706/55 |
| 7,818,328 B2 * | 10/2010 | Bottger et al. | ................ | 707/755 |
| 8,364,642 B1 * | 1/2013 | Garrod et al. | ................. | 707/648 |
| 2004/0009022 A1 * | 1/2004 | Matsunaga et al. | ............. | 400/61 |
| 2005/0050461 A1 * | 3/2005 | Hall et al. | ...................... | 715/513 |
| 2007/0043733 A1 * | 2/2007 | Cannon et al. | ................... | 707/10 |
| 2007/0156767 A1 * | 7/2007 | Hoang et al. | ................. | 707/200 |
| 2007/0198987 A1 * | 8/2007 | Bottger et al. | ............... | 719/312 |
| 2009/0327347 A1 * | 12/2009 | Hoang et al. | ............... | 707/104.1 |
| 2011/0196893 A1 * | 8/2011 | Bates et al. | .................... | 707/770 |
| 2012/0066586 A1 * | 3/2012 | Shemesh | ........................ | 715/235 |
| 2013/0132348 A1 * | 5/2013 | Garrod et al. | ................. | 707/648 |

OTHER PUBLICATIONS

Palme et al., "MIME Encapsulation of Aggregate Documents, such as HTML (MHTML)", RFC-2557, Mar. 1999, 28 pages.

* cited by examiner

*Primary Examiner* — Phong Nguyen
(74) *Attorney, Agent, or Firm* — Yeen Tham; Edell, Shapiro & Finnan, LLC

(57) ABSTRACT

Embodiments of preservation solutions are presented herein. In particular, embodiments of such preservation solution may access a collaborative platform to preserve a collaborative content object by determining if any objects of a collaborative content object have been previously preserved. If none of the objects have been previously preserved, an archive for that collaborative content object may be created and stored. If, however, at least one of the objects of the collaborative object have been previously preserved, it can be determined if any objects of the compound content object have changed since the collaborative content object was previously preserved. An archive for only these changed objects (if any exist) may then be created and stored. Using these archives, at some point a review archive may be created and used to review the state of the collaborative content objects.

16 Claims, 22 Drawing Sheets

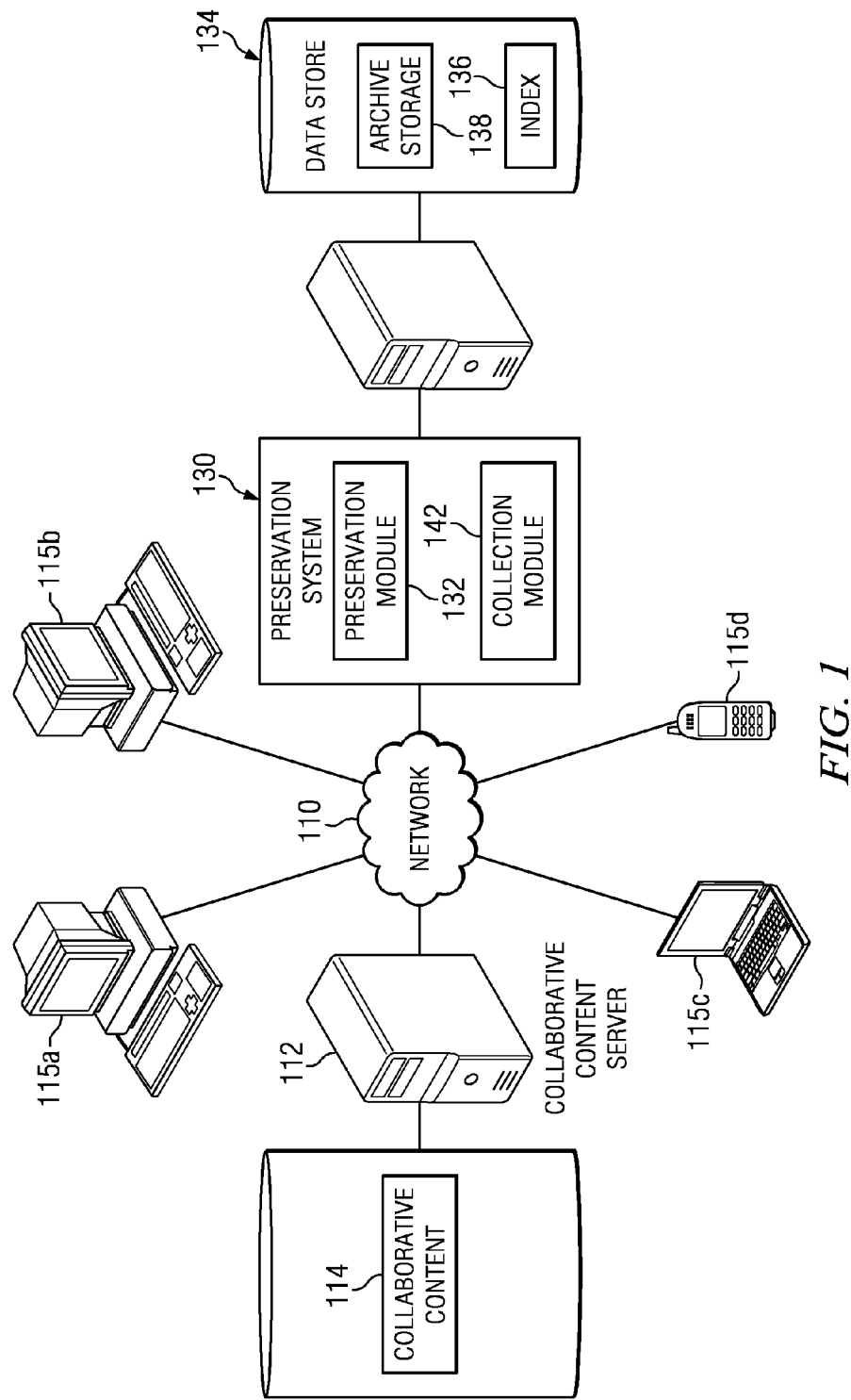

```
<table width="98%" height="100%" cellpadding="0" border="0" align="center">
<tr>
    <td width="360" valign="top">
        <div><h3>Table of Contents:</h3></div>
        <iframe src="cid:000001.html" style="margin-top: 5px;" name="toc" align="middle" height="460" width="310" id="entities" frameborder="0">
        </iframe>
    </td>                                                                    ⌐ 662

<td width="8"><img src="images/spacer.gif" width="8" height="1"></td>
    <td width="100%" valign="top" id="fileCell" class="SectionBlocks">
        <table width="100%" cellpadding="0" cellspacing="0" border="0">
        <tr>
            <td><div><h3>Steganography in the forensics world</h3></div></td>
        </tr>
        </table>
        <div class="RegularText" style="align:center;text-align:center" id="pageNumberCell"><br></div>
        <iframe src="cid:000002.htm" style="margin-top: 5px;border: 1px solid 1e7e7e7;" name="file" align="center"
        width="98%" scrolling="auto" id="file" frameborder="0"></iframe>    664
    </td>
</tr>
</table>
```

*FIG. 6B*

```
<h3>Discussion Thread:</h3>
<vl class="native">
    <li>
        <a href="cid:000002.htm" !target="file"> Steganography in the forensics world</a> <span class="spacer"> | </span> <a href ="cid:000003.html" class
!target="file">Metadata</a>
    </li>
</vl>

<br><br>
<div><h4>Replies and attachments: </h4></div>
        <vl class="native">
    <li>
        <a href="cid:000004.htm" !target="file">Tom Olman-10.repl</a> <span class="spacer"> | </span> <a href="cid000005.html" class="metadata"
!target="file">Metadata</a>
    </li>
</vl>
```

| node_id | file_path | file_name |
|---|---|---|
| 20831bb5d19dd242b9d557bb28e62b6dfcc4fa9e | E-Discovery Discussion | Steganography in the forensics world.disc |
| e900b212807dc5c93c60ea5bf86d08b26f9bc443 | E-Discovery Discussion | Tom Olman-10.repl |
| 35d4a6dad728ba872d31c3aa92c5d4cf930414cc | E-Discovery Discussion | System Account-41.repl |

| container_path | version | fs_mtime |
|---|---|---|
| | | 2010-09-26 15:09:39 |
| Steganography in the forensics world.disc | | 2010-09-28 08:37:48 |
| Steganography in the forensics world.disc/Tom Olman-10.repl | | 2012-03-14 06:41:55 |

| thread_index |
|---|
| 0x01cd2bcde282314c3a46cd0843b38a39d4b8b36fd0da |
| 0x01cd2bcde282314c3a46cd0843b38a39d4b8b36fd0da0056e5d412 |
| 0x01cd2bcde282314c3a46cd0843b38a39d4b8b36fd0da0056e5d41268b14764ee |

| content_address |
|---|
| \|sites\|teamblog~{2BD2A1D0-9524-4D04-8542-2473C05A498C}~Lists\|EDiscovery Discussion\|Steganography in the forensics world~~9 |
| \|sites\|teamblog~{2BD2A1D0-9524-4D04-8542-2473C05A498C}~Lists\|EDiscovery Discussion\|Steganography in the forensics world~~9 |
| \|sites\|teamblog~{2BD2A1D0-9524-4D04-8542-2473C05A498C}~Lists\|EDiscovery Discussion\|Steganography in the forensics world~~9 |

| member_path |
|---|
| H\|sites\|teamblog~{2BD2A1D0-9524-4D04-8542-2473C05A498C}~Lists\|EDiscovery Discussion#4783teganography in the forensics world\|10_.000~~10 |
| H\|sites\|teamblog~{2BD2A1D0-9524-4D04-8542-2473C05A498C}~Lists\|EDiscovery Discussion#4783teganography in the forensics world\|10_.000~~10H |
| \|sites\|teamblog~{2BD2A1D0-9524-4D04-8542-2473C05A498C}~Lists\|EDiscovery Discussion#4783teganography in the forensics world\|41_.000~~41 |

Steganography in the forensics world - Threaded - Windows Internet Explorer ad2010.local File  Edit  View  Favorites  Tools  Help Steganography in the for....  |  StoredIQ - Steganography in...

Site Actions ▼  Browse  List Tools / List

Posts
Comments
Categories
Discussions
E-Discovery Discussion
Surveys
Recycle Bin
All Site Content Posted: 9/28/2010 8:37 AM by Tom Olman                                       View Properties  Reply StegDetect and StegBreak developed by Niels Provos, a doctoral graduate of the University of Michigan and licensed under the GNU General Public License (GNU GPL), is available for download at OutGuess - universal Steganography without cost in source code form and as a Microsoft Windows executable binary.

• Tag
» Show Quoted Messages
720

Posted: 3/14/2012 6:41 AM by System Account                                  View Properties  Reply I had first heard about Steganography in school, but never got a chance to dive deeper. Does anyone have anymore information on tools we could use to crack these encoded documents?

» Show Quoted Messages
730

Posted: 3/14/2012 7:59 AM by Tom Olman                                       View Properties  Reply Did I just type Tag instead of Tom?
• Tom
» Show Quoted Messages
740

*FIG. 7C*

| node_id | file_path | file_name |
|---|---|---|
| 20831bb5d19dd242b9d557b28e62b6dfcc4fa9e | E-Discovery Discussion | Steganography in the forensics world.disc |
| e900b212807dc5c93c60ea5bf86d08b26f9bc443 | E-Discovery Discussion | Tom Olman-10.repl |
| 35d4a6dad728ba872d31c3aa92c5d4cf930414cc | E-Discovery Discussion | System Account-41.repl |
| 85ee0c55fb924077f48e0548b5cadafbadc2835d | E-Discovery Discussion | Tom Olman-42.repl |

| container_path | version | fs_mtime |
|---|---|---|
| | | 2010-09-26 15:09:39 |
| Steganography in the forensics world.disc | | 2010-09-28 08:37:48 |
| Steganography in the forensics world.disc/Tom Olman-10.repl | | 2012-03-14 06:41:55 |
| Steganography in the forensics world.disc/Tom Olman-10.repl | | 2012-03-14 07:59:11 |

| thread_index |
|---|
| 0x01cd2bcde282314c3a46cd0843b38a39d4b8b36fd0da |
| 0x01cd2bcde282314c3a46cd0843b38a39d4b8b36fd0da0056e5d412 |
| 0x01cd2bcde282314c3a46cd0843b38a39d4b8b36fd0da0056e5d41268b14764ee |
| 0x01cd2bcde282314c3a46cd0843b38a39d4b8b36fd0da0056e5d41268b3fa32b4 |

TO FIG. 7E

*FIG. 7D*

Table of Contents:

Discussion Thread:
810 — • Steganography in the forensics world | Metadata — 812

Replies and attachments: — 822
820 — • Tom Olman-10.repl | Metadata — 832
830 — • System Account-4.repl | Metadata
840 — • Tom Olman-42.repl | Metadata — 842

802

Stenography in the forensics world — 850

I have just recently learned about steganography and how it can be used in the forensics world. It is extremely effective to hide messages or important information within other forms of information. Such as zip or txt files within jpegs.

I was curious as what what else you could use steganography for in the digital world.

Also, if anyone knows of some software or scripts that tie into this topic it would be greatly appreciated.

Thanks

Replies
Tom Olman-10.repl

StegDetect and StegBreak developed by Niels Provos, a doctoral graduate of the University of Michigan and licensed under the GNU General Public License (GNU GPL), is available for download at OutGuess – universal Steganography without cost in source code form and as a Microsoft Windows executable binary.

- Tag

*FIG. 8A*

Table of Contents:

Discussion Thread:
- Steganography in the forensics world | Metadata

Replies and attachments:
- Tom Olman-10.rep | Metadata
- System Account-41.rep | Metadata
- Tom Olman-42.rep | Metadata Stenography in the forensics world

Stenography in the forensics world.disc    850

System Metadata

Type: SharePoint Discussion Thread     Group: N/A
  Volume type: SharePoint     Size: 535
    Volume: shpt.ad2010.local:/sites/teamblog   Accessed date: 2010-09-26 15:09:39
  System path: E-Discovery Discussion   Modified date: 2010-09-26 15:09:39
    Owner: AD2010\administrator   Created date: 2010-09-26 15:09:39

Discussion Thread Metadata

Version (SharePoint): 1.0
        URL (SharePoint): http://shpt.ad2010.local/sites/teamblog/Lists/EDiscovery
                            Discussion/Steganography in the forensics world
        Title (SharePoint): Steganography in the forensics world
     Author (SharePoint): AD2010\administrator
      Editor (SharePoint): AD2010\administrator
  Approval status (SharePoint): Approved
    Content type (SharePoint): Discussion
  Publishing level (SharePoint): Published
  Discussion status bar (SharePoint): 2010-09-26T15:09:39

COLLECTION OF DATA FROM COLLABORATION PLATFORMS

TECHNICAL FIELD

This disclosure relates generally to managing and controlling data storage resources. More specifically, this disclosure relates to data collection or archiving. In particular, this disclosure relates to the collection and archiving of data associated with a collaboration platform.

BACKGROUND

An increasingly litigious environment and the presence of new rules and regulations such as the Health Insurance Portability and Accountability Act of 1996 (HIPAA) and the Sarbanes-Oxley Act of 2002 present serious problems for the modern computer centered and information driven business enterprise. In particular, preservation of data stored on their computers to protect it from spoliation, deletion or corruption may be required in order for a business enterprise to satisfy legal requirements for electronic discovery (E-Discovery) as well as compliance requirements related to government prescribed regulations. Even in the absence of such requirements or regulations a robust data preservation policy may also act as a proactive measure toward ensuring that the data driving business decisions is always available on demand.

A number of solutions are available to find and preserve documents carrying the business-critical information by making copies of these documents and storing them in a reliable or secure location. Depending on the end-goal, such solutions may be labeled as back-up solutions (copying to ensure recoverability on loss of data), archive solutions (moving data from an active and heavily used server to ensure servers can perform optimally) or preservation solutions (copying to ensure availability of authentic data in case of spoliation or corruption during an on-going lawsuit). Solutions to find and preserve documents will be referred to collectively herein as preservation solutions.

The traditional preservation solutions described above have evolved over time to develop the ability to preserve more modern forms of data. However, as the world continues to move towards ever more complex forms of data such as data for collaborative platforms, these preservation solutions are having to keep up with the increasingly complex structures used to store and associate this type of data.

To compound the problem further, by their intended design many of these collaborative platforms actively encourage multiple users to edit or add to a particular object, increasing the complexity of the structures used to store this data and creating revisions of these objects that may be desirable to preserve to ensure that the history and lifecycle of such objects is also tracked.

What is desired then, are preservation solutions which efficiently and effectively identify and preserve such objects.

SUMMARY

Embodiments of preservation solutions that are presented herein. Embodiments of such preservation solutions may access a collaborative platform to preserve a compound content object. Archives for these compound content objects may be created based on objects changed between the creation of these archives. Using these archives, at some point a single review archive may be created and used to review the state of the compound content objects (and the individual objects and any associated metadata which comprise the compound object).

An archive may be presented in an easily navigable format to allow intuitive review of the objects archived therein. This format may, for example, comprise a two frame layout where one frame presents a table of contents comprising links associated with the individual objects (or any associated metadata) archived therein, where the links are presented in a manner where the relationship of those objects to one another can be easily discerned from the visual relationships of the links to one another. Another frame may be used to present the content or metadata of the objects themselves based on a user's interactions with the links presented in the table of contents frame.

Thus, embodiments as disclosed herein may allow incremental preservation of collaborative content where only changed objects are archived at a given point but they are archived in such a way that they can be associated with other objects from that collaborative content and collected into a single review archive. These archives may be configured to present intuitive interfaces which preserve the look-and-feel of the original collaborative content and may allow navigability across various parts of the collaborative content provided.

In particular, in one embodiment, a method for incrementally preserving collaborative content may determine a first set of objects of a collaborative content object at a first time, create a first archive comprising the first set of objects of the collaborative content object, determine a second set of objects of the collaborative content object at a second time, determine that the second set of objects includes one or more changed objects that have changed between the first time and the second time and create a second archive comprising the one or more changed objects that have changed between the first time and the second time. This archive may include a structure descriptor that includes data on a relationship between the one or more objects that have changed and the first set of objects in the first archive. These archives may also include metadata on the first set of objects or the changed objects The first and second archive may be grouped at some point to create a review archive from the first archive and the second archive, where the review archive comprises the first set of objects and the one or more changed objects.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 illustrates one embodiment of an architecture including a preservation system.

FIGS. 6B and 6C illustrate embodiments of code of an archive.

FIG. 7A illustrates one example of collaborative content.

FIG. 7B illustrates one example of an index.

FIG. 7C illustrates one example of collaborative content.

FIGS. 7D and 7E illustrate one example of an index.

FIGS. 8A-8C illustrate embodiments of interfaces.

DETAILED DESCRIPTION

Figure 2A:
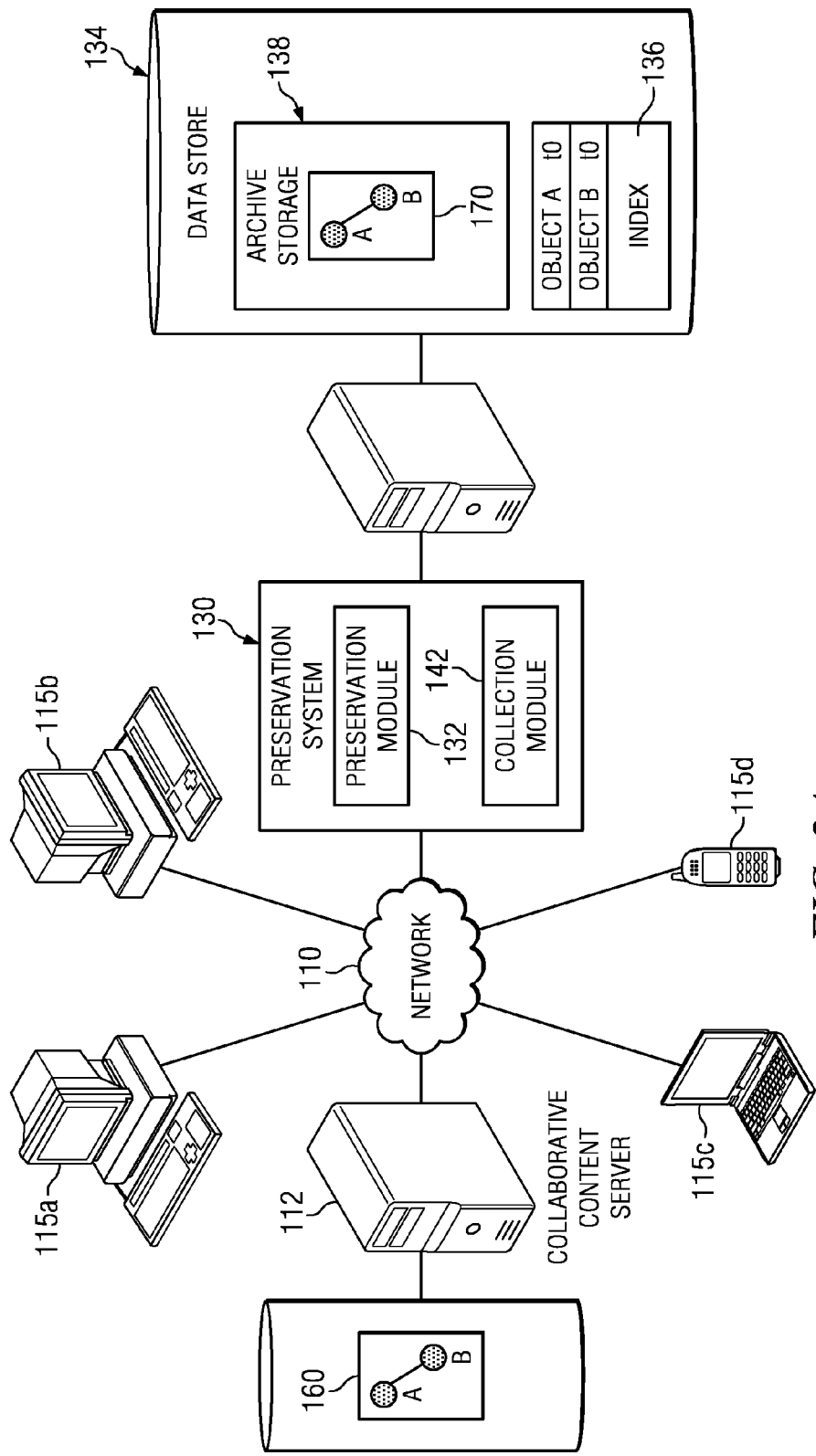
FIGS. 2A-2C illustrate an architecture including a preservation system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer (computer device) communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database, which may be local or accessed over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Before describing particular embodiments it may be useful to describe certain embodiments generally. As discussed above, the use of collaborative platforms (for example, SharePoint, Jive, NewsGator, etc.) which may support the generation and presentation of content in a threaded manner and allow multiple users to contribute such content, present unique problems to preservation solutions. At least partially, these problems stem from the types of content which these collaborative platforms allow one or more users to create. The content created using these collaborative platforms (for example, blog posts along with their comments/replies etc., threaded discussions, wikis, tasks, announcements, issue trackers, etc.) may be generally interchangeably described as compound content objects or collaborative content objects. Compound content objects are comprised of multiple objects that are related to each other in some manner, for example, hierarchically. Thus, for example, a task may comprise file attachments; a blog post may comprise an object that is the initial post, an object that is a reply to the initial post, another object that is a reply to that reply, etc.

As these collaborative platforms usually render these compound content objects to a user utilizing HTML, one manner of addressing the preservation problem discussed above is to capture the HTML associated with the presentation of the compound content object. To illustrate a specific example, a prevalent method for preserving data from SharePoint is to capture compound content objects as Hyper-Text Markup Language (HTML) pages using a web-crawler that can follow the links on a SharePoint server to locate unique HTML pages hosted on that server.

It will be realized however, that preservation solutions may entail pro-active collections that run on regular or semi-regular schedule. Thus, it would be desirable if such preservation solutions could determine changed objects (i.e. added or altered objects) and only preserve those objects which have changed. In other words, if a blog post comprising an initial post and a single reply has been preserved at a first time and a second reply has been added after the first time, when the preservation solution is subsequently run again at a second time it is desired that such a preservation solution not duplicate the originally preserved initial post and first reply but instead determine that a second reply has been added, preserve this second reply and associate this second reply with the blog post.

Furthermore, in many cases, an object on a collaborative platform may be much more than just the content presented when the compound content object comprising that object is rendered. These objects may also comprise metadata that carry significant information pertaining to the object. For example, a Task on the SharePoint collaborative platform may comprise metadata for a Start Date, an End Date, Assignees, Priority, etc. Thus, it would also be desirable to capture such metadata in association with the objects to which it pertains.

Typical preservation solutions, however, fall short with respect to both of the aforementioned desires as each time such preservation solutions are run they preserve only the rendered content of each compound content object as rendered and additionally preserve each compound content object anew with every run, regardless of any changes which have (or have not) occurred with respect to these compound content objects. As may be imagined, in cases where these compound content objects change repeatedly over time (for example, a heavily commented blog post) the redundancy entailed by such repeated preservation is a waste of both storage and computational resources.

Moreover, these traditional solutions fall short in a number of other respects. One of the most important aspects where these solutions fall short is in access and review of the preserved compound content objects. In many cases, to review the compound content objects preserved by these previous solutions requires the installation of specialized software by the reviewer or may even entail the use of the same collaborative platform with which the compound content object was originally created. In addition, these previous solutions do not allow a reviewer to access the individual objects which comprise that compound content object. Exacerbating this problem is that because these previous solution do not correlate the same compound content object preserved at different times, a reviewer cannot be presented the revision history associated with the compound content object or the objects which comprise it.

It would be desirable therefore, if a preservation solution could be tailored to collaborative platforms such that the compound content object created using these collaborative platforms can be preserved incrementally by preserving only the changed objects of the compound content objects during each preservation in such a way that none of the objects comprising a compound content objects are duplicated during preservation. Furthermore, it would additionally be desirable if such preservation solutions would preserve the metadata of each of the preserved objects (if it exists) and allow review of a compound content object (and their associated metadata) in an intuitive format using commonly installed software.

To that end, attention is now directed to the embodiments of preservation solutions that are presented herein. Embodiments of such preservation solutions may access a collaborative platform to preserve a compound content object. These preservation solutions may determine if any objects of that compound content objects have been previously archived. If none of the objects have been previously preserved, an archive for that compound content object may be created and stored. If, however, at least one of the objects of the compound object has been previously archived, it can be determined if any objects of the compound content object have changed (i.e. objects which have been added or altered) since the compound content object was previously archived. An archive for only these changed objects (if any exist) may then be created and stored. Using these archives, at some point a single review archive may be created and used to review the state of the compound content objects (and the individual objects and any associated metadata which comprise the compound object).

In one particular embodiment, each of the archives may be a self-contained archive that may be rendered by applications that are commonly installed on most computer platforms or that come bundled with the installation of common operating systems, such as a web browser or the like. When rendered by such an application an archive may be presented in an easily navigable format to allow intuitive review of the objects archived therein. This format may, for example, comprise a two frame layout where one frame presents a table of contents comprising links associated with the individual objects (or any associated metadata) archived therein, where the links are presented in a manner where the relationship of those objects to one another can be easily discerned from the visual relationships of the links to one another. Another frame may be used to present the content or metadata of the objects themselves based on a user's interactions with the links presented in the table of contents frame.

To achieve presentation formats of this type (or others) while maintaining the desired level of accessibility, in one embodiment each archive may be in the Multipurpose Internet Mail Extension (MIME) HTML (MHTML) format as described in the "MIME Encapsulation of Aggregate Documents, such as HTML (MHTML)" RFC-2557 by J. Palme, A. Hopmann and N. Shelness published March 1999 which is hereby incorporated by reference in its entirety. Thus, each of the archives created by embodiments of the preservation solution may be individually reviewable such that the objects captured in that archive may be reviewed.

Furthermore, each of the MHTML archives created may comprise a structure descriptor which comprises data on each object (or associated metadata) contained in that MHTML archive, including data on the relationship of an object to one or more other objects of the compound content object and the location of the object within the MHTML archive. This structure descriptor may allow a single MHTML review archive to be constructed from multiple MHTML archives created at different points in time.

Accordingly, embodiments of the preservation solutions presented herein may allow for incremental preservation of compound content objects utilized by collaborative platforms which, in turn, may utilize less bandwidth for preservation or collection processes, shorter windows for preservation or collections and ultimately a greatly reduced storage footprint for the preserved data. In fact, while one could see archives from previous preservation solutions being many times the size of the source collaborative platform with a multitude of copies of each compound content object, embodiments as presented herein may maintain a low ratio between the size of the storage footprint of the preserved data and the size of the data on the source collaborative platform, in some cases achieving near a 1:1 size ratio.

Furthermore, embodiments as disclosed herein may be able to present the archived objects in self-contained MHTML archive that can be easily reviewed in a web browser. When these archives are presented they may present a user-friendly interface for navigating the various objects contained therein. Furthermore, these archives may include structure descriptors specifying relationships associated with the objects therein. These structure descriptors allow multiple archives from different points in time to be combined into a single archive such that by reviewing that single review archive a user may gain insight into the state of a compound content object at a particular moment in time.

Moving now to FIG. 1, one embodiment of an architecture which may be utilized in association with embodiments presented herein is depicted. A computing environment may comprise a number of computing devices 115 and one or more collaborative content servers 112 communicating over a network 110, which may be for example, a network having wireless or wired portions, the Internet, an internet, an intranet, a LAN, a WAN, or any other electronic communication network known in the art. Collaborative content server 112 may be a computing device providing a collaborative platform such as SharePoint, NewsGator, Jive or another type of platform though which multiple users may generate, review, or otherwise access collaborative content. Examples of such content, include blog posts on which users may generate and edit comments or replies to comments, threaded discussions, wikis, a Task, an Announcement, an Issue Tracker, etc.

Accordingly, multiple users may access and contribute to such collaborative content using the collaborative content server 112. The collaborative content 114 may be stored on the collaborative content server 112 as a collaborative content object, where access to each of the individual object comprising that collaborative content may also be allowed. For example, a user at computing device 115a may generate a blog post using collaborative content server 112 at a first time. At some later point another user at computing device 115b may access this blog post and generate a reply to the blog post. The blog post is thus collaborative content, where each user has contributed content to this collaborative content. This collaborative content is stored by the collaborative content server 112 as a collaborative content object, with the content contributed by each user also accessible at the collaborative content server 112 as individual objects (e.g. the initial blog post can be individually obtained from the collaborative content server 112, metadata associated with the initial blog post can be individually obtained from the collaborative content server 112, the reply may be individually obtained from the collaborative content server 112, etc.).

Preservation system 130 is configured to access the collaborative content server 112 in order to preserve collaborative content objects stored on the collaborative content server 112. Preservation system 130 thus may be a computing device including a preservation module 132, and a data store 134. The data store 134 includes an object index 136 comprising an identifier for each of the objects previously archived by the preservation system 130 and archive storage 138 in which these objects are stored.

Preservation module 132 is configured to access the collaborative content server 112 over the network 110 to identify collaborative content objects stored by the collaborative content server 112 and determine if objects associated with an identified collaborative content object have been previously archived by accessing index 136. If none of the objects of the collaborative content object have been previously archived, the preservation module 132 may create an archive that includes all the objects of the collaborative content object and a structure that describes their relationship(s), in the archive 138 and update the index 136 to include identifiers for these objects.

If, however, one or more of the objects of an identified collaborative content object have been previously archived, preservation module 132 is configured to determine if any objects of the collaborative content object have changed (i.e. have been added or altered). The preservation module 132 may then create an archive in archive storage 138 that includes all the changed objects (if any exist) associated with the collaborative content object and a structure that describes their relationship(s) in the archive and update the index 136 to include identifiers for these changed objects. In this manner, preservation module 132 may be configured to perform incremental archiving of collaborative content objects stored on the collaborative content server 112 on a one-time, regular or semi-regular basis.

Collection module 142 is configured to utilize the archives stored in the archive storage 138 to create a review archive. More specifically, the collection module may be configured to identify multiple archives associated with the same collaborative content object in the archive storage 138. The collection module 142 can then form a review archive associated with this collaborative content object, where the review archive comprises all of the objects in the multiple archives structured according to the structure descriptors in each of the archives.

Collection module 142 may be utilized in a wide variety of manners to generate and provide these review archives. For example, an interface such as a hyper-text transfer protocol (HTTP) based interface may be used to request a review archive for a particular collaborative content object and the collection module 142 may create and return such a review archive in response to the request.

The collection module 142 may also generate review archives for every identified collaborative content object based on the passing of some time period or the occurrence of some actions and these review archives may be stored in archive storage 138 or exported for use. The collection module may also use other metrics to group archives in archive storage 138 and to create a single review archive for these groups.

Archives created by the preservation system 138 may be rendered by a browser application at a reviewer's computer system (which may be for example, a computing device 115, the preservation system 130 itself, or another computer device entirely (not shown)) such that a reviewer may review the objects associated with that archive.

Figure 2B:
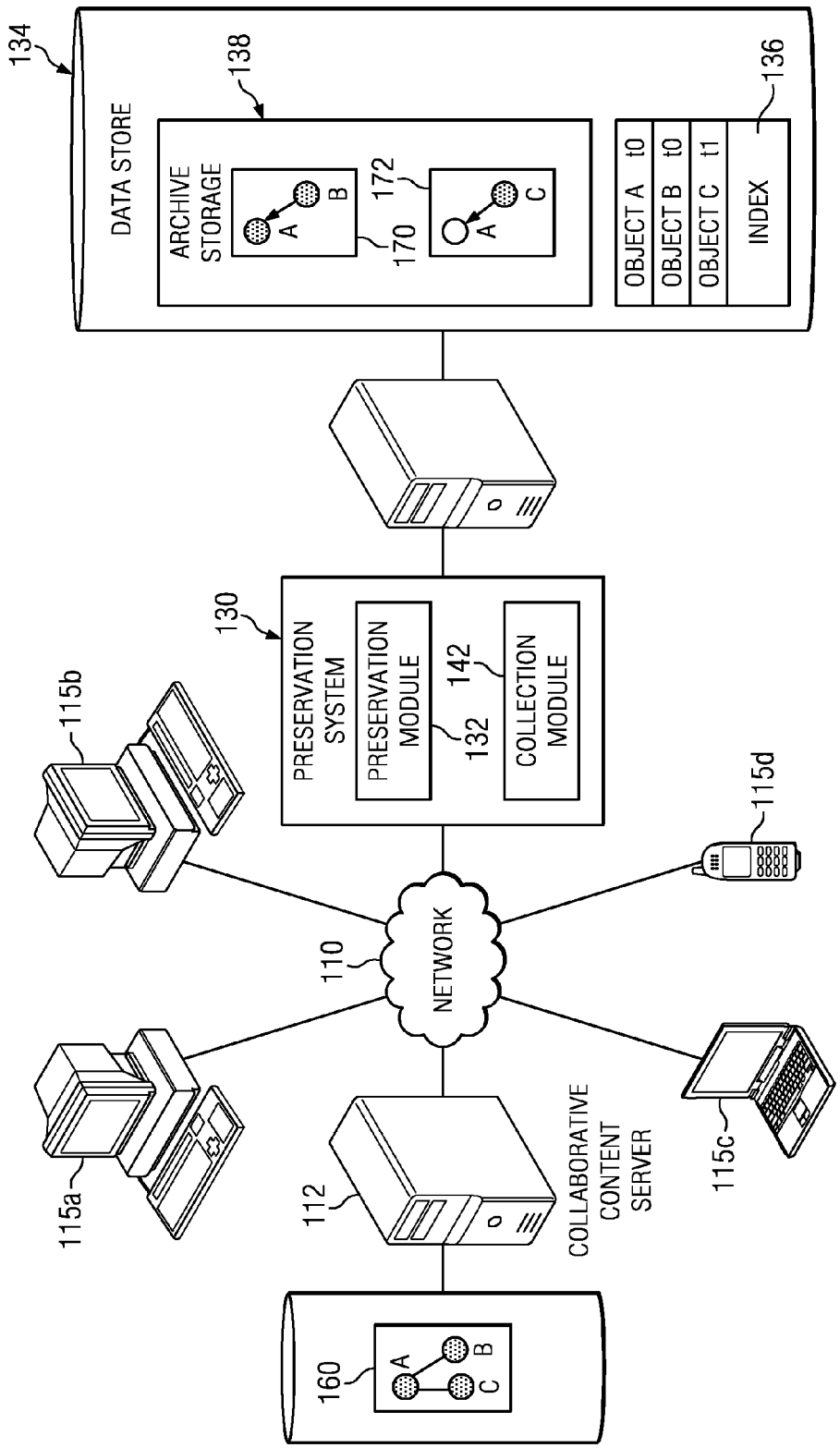
Figure 2C:
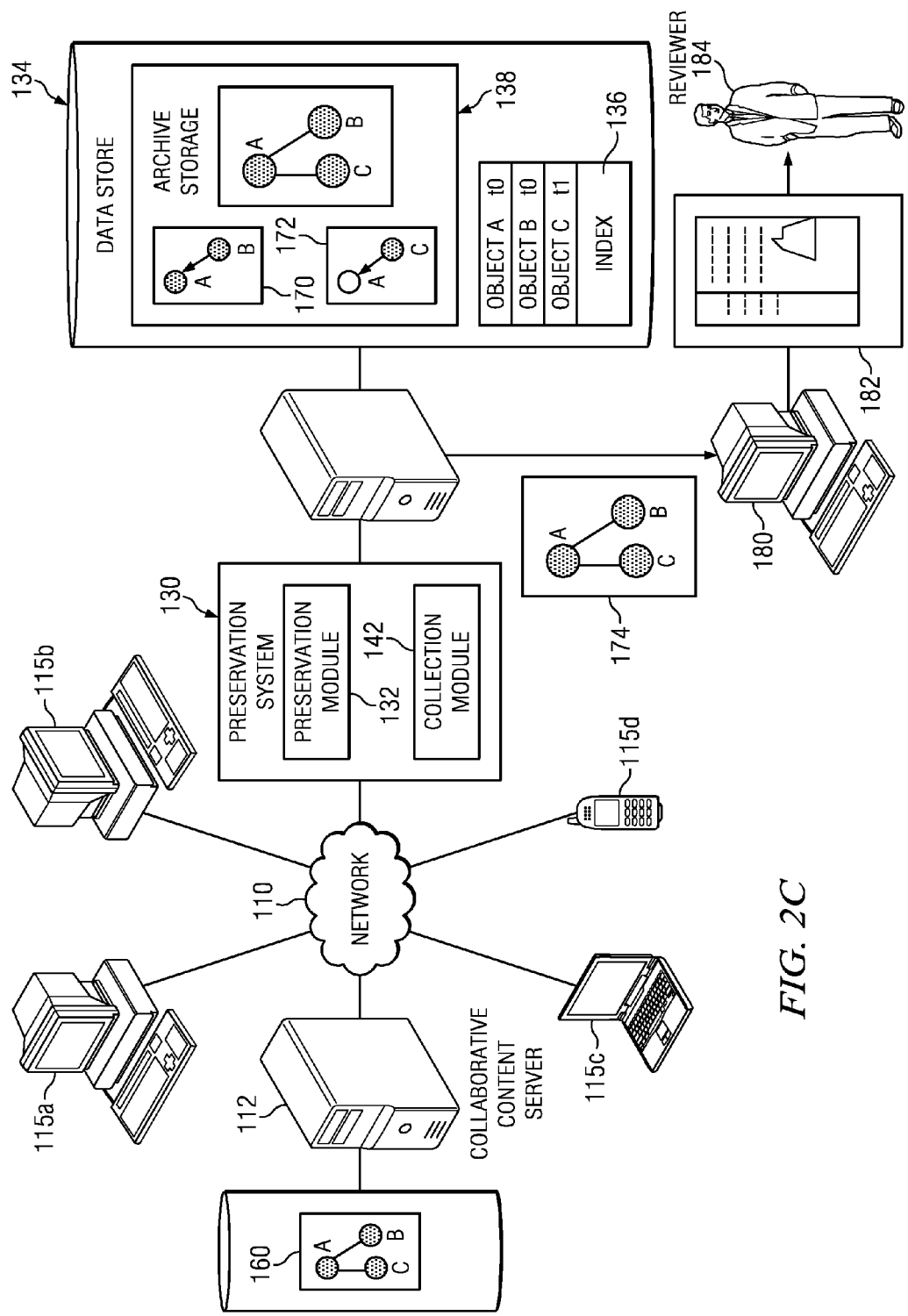

Turning to FIGS. 2A-2C, an example scenario of the creation and incremental preservation of collaborative content using an embodiment of an architecture as depicted in FIG. 1 is shown. Suppose initially a user at a computing device 115 creates a blog post using collaborative platform server 112 and another user comments on that blog post. Collaborative content server 112 may store this collaborative content as collaborative content object 160 comprising object "A" the initial blog post and object "B" the comment on that blog post.

Now suppose that at some point (for purposes of this example call this time "t0") preservation module 132 accesses collaborative content server 112 and identifies collaborative content object 160. Preservation module 132 may determine (e.g. by querying collaborative content server 112) that collaborative content object 160 comprises object "A" and object "B" and may then access index 136 to determine if either of these objects has been previously archived. Since identifiers for neither of these objects is found in index 136, preservation module 132 may add identifiers for object "A"

and object "B" to index 136. Additionally, preservation module 132 may obtain object "A", object "B" and any metadata associated with object "A" and object "B" from collaborative content server 112. Using the obtained objects and any obtained metadata preservation module 132 may create archive 170 and store the archive 170 in the archive storage 138. The archive 170 may comprise object "A", object "B", any metadata associated with object "A" or object "B" and a structure descriptor describing the hierarchical relationship between object "A" and object "B".

Moving on to FIG. 2B, now suppose that some time after time t0 a user adds another comment to the same blog post. Collaborative content server 112 may update the collaborative content object 160 for the blog post such that it comprises object "A" the initial blog post, object "B" the first comment on that blog post and object "C" the second comment on that blog post.

Suppose further that at some later point (for purposes of this example call this time "t1") preservation module 132 accesses collaborative content server 112 and identifies collaborative content object 160. Preservation module 132 may determine that collaborative content object 160 comprises object "A", object "B" and object "C" and access index 136 to determine if any of these objects has been previously archived. Since identifiers for object "A" and object "B" are found in index 136, preservation module 132 may only add an identifier for object "C" to index 136. Additionally, preservation module 132 may obtain object "C" and any metadata associated with object "C" from collaborative content server 112. Using the obtained object and any obtained metadata, preservation module 132 may create archive 172 and store the archive 172 in the archive storage 138. The archive 172 may comprise object "C", any metadata associated with object "C" and a structure descriptor describing the hierarchical relationship between object "C" and object "A".

Continuing with the above example, at some point thereafter then (e.g. after time t1), as depicted in FIG. 2C, collection module 142 may identify that archive 170 and archive 172 in the archive storage 138 are associated with the same collaborative content object. This identification may, for example, be done using index 136 or the structure descriptors of archives 170 and 172. The collection module 142 can then form review archive 174 associated with this collaborative content object, where the review archive comprises all of the objects in archives 170 and 172 and describing the structure of these objects according to the structure descriptors in each of the archives 170 and 172.

This review archive 174 may be provided to a computing device 180 associated with a reviewer 184, either directly from preservation system 130 or through one or more intermediary computer systems. An application 182 on the reviewer's computing device 180 can then render the review archive 174 for presentation to the reviewer 184 who may interact with the interface presented by the application 182 to access the objects, the associated metadata, or other information, of review archive 174. To aid in a review of such an archive, in one embodiment, the rendering of the review archive 174 by the application 182 may present objects similarly to the presentation of the collaborative content object to a user by collaborative content server 112. It should be noted here, that any of the other archives 170 and 172 created by the preservation may also be provided to the computing device 180 associated with the reviewer 184 and similarly rendered for presentation to the reviewer 184 by application 182 in the same manner as the review archive 174.

Figure 3A:
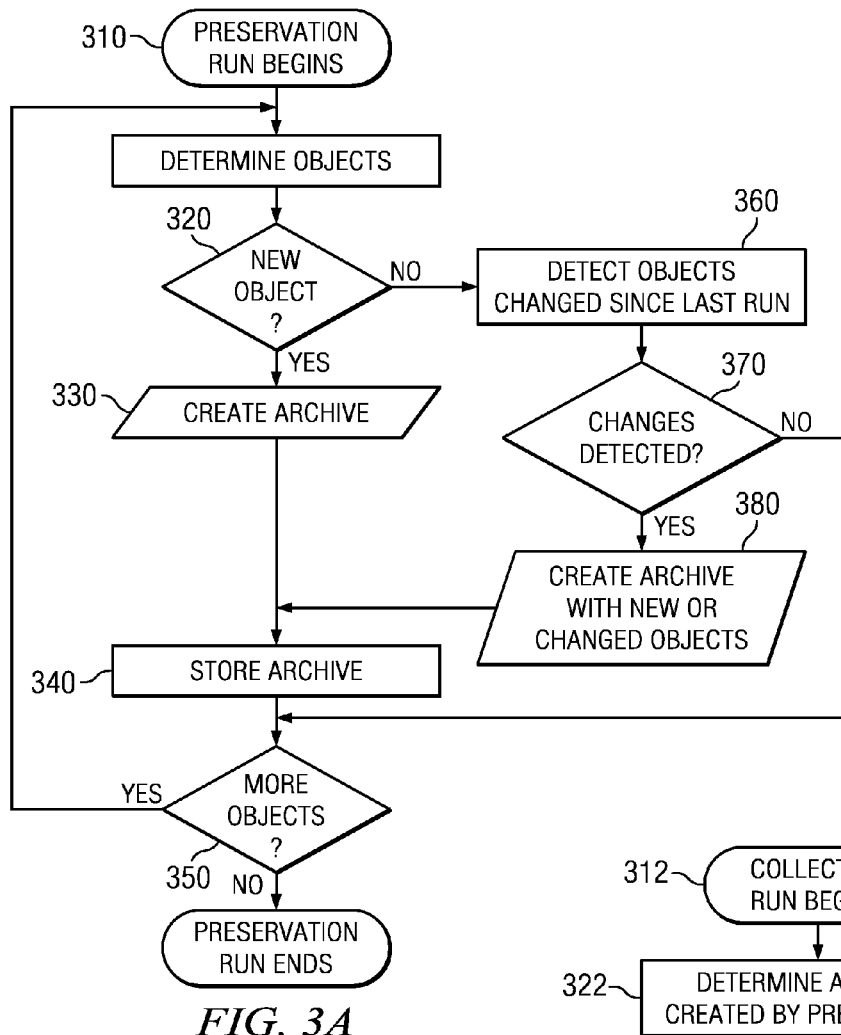
FIG. 3A illustrates a method.
Figure 3B:
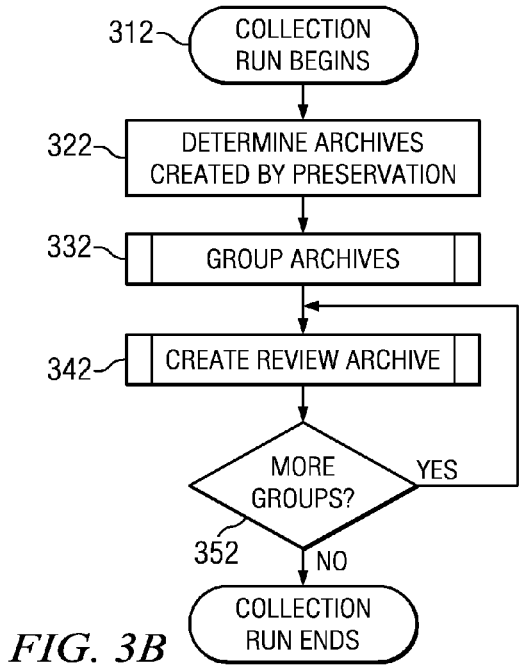
FIG. 3B illustrates a method.

Thus, embodiments of a preservation system may operate according to the methods for incrementally preserving collaborative content objects and forming review archives that are depicted in FIGS. 3A and 3B.

Looking first at FIG. 3A, a flow diagram for one embodiment of a method for incrementally preserving collaborative content objects is depicted. At step 310 a preservation run begins. A preservation run is the archiving of objects stored in association with a collaborative platform server. A preservation run may be run on a regular (e.g. on a set schedule, such as every night, every week, etc.) or a semi-regular basis as needed or desired. Initially during a preservation run a collaborative content server may be accessed and the identity of each of the collaborative content objects stored in conjunction with the collaborative platform server may be determined. Each collaborative content object may be associated with a collaborative content item provided by the collaborative content server. For each of the collaborative content objects determined, it can be determined at step 320 if this is a new collaborative content object. This determination may be made by determining if any of the objects comprising that collaborative content object have been previously archived.

In one embodiment, data on previously archived object may be stored in an index. An index may comprise unique identifiers for each individual object previously archived. Thus, by comparing the identifiers for an object found in a given preservation run with the identifiers stored in the index a determination can be made if that object has been previously archived. Other information may also be stored, for example, when different versions of the same object are present, the database might additionally store version numbers and last modified timestamps to detect changes as opposed to just detecting new objects.

In some embodiments, an index may include information such as:

FilePath: A path leading to the object. For example, in the case of a discussion thread, this may include the user-friendly name of the Discussion Board.

FileName: A user-friendly name of the indexed object. For example, for posts, this may include the subject of the post and for replies, this may include the name of the Responder.

ContainerPath: In the case of parent-child relationships between objects, the ContainerPath describes the names of the parent(s) for a child object. For posts, this is empty. For replies, this includes the names of the post and any earlier replies in the branch leading to the reply.

Version: Version number of the object, if any. (1.0, 2.0, etc.)

FsMtime: Last modified date of the indexed object. This may be used to determine when an object has been modified (changed) with respect to the last time it was archived or indexed.

ThreadIndex: Unique identifier of an object within a thread.

ContentAddress: Addressing information that may be used to access the object from the source collaborative content server. In the case of discussion threads, this includes information like SharePoint site address, Discussion Board identifier, and other unique identifiers that may be utilized (e.g. by API requests).

MemberPath: Additional addressing information to fetch members after one gets to the parent object. In the case of discussion threads for example, the Content Address can be used to access the Post, and the MemberPath then provides the information the API will seek to reach the Reply.

NodeID: Unique identifier for every object in the database. Computed by hashing properties of an object that make it unique. For example, in the case of a discussion thread, this will include the SharePoint server information, the unique ThreadIndex, the Version number of the object (if any), the Content Address and the Member Path.

Still referring to FIG. 3A, if the collaborative content object is new, an archive for that collaborative content object may be created at step 330 and stored at step 340. This archive may comprise the objects and any associated metadata for each object comprising the collaborative content object along with a structure descriptor comprising information on the relationship between those objects. For example, each object may be associated with an identifier (referred to herein as an object identifier) that associates the object with the collaborative content object which comprises that object and defines a hierarchical relationship of that object with respect to that collaborative content object or other objects of that collaborative content object. The identifier for each object in the archive may be stored in the structure descriptor of that archive. After the archive for the collaborative content object is created, it can then be determined, at step 350, if there are additional collaborative content objects on the collaborative content server to process.

Returning to step 320, if the collaborative content object is not new (i.e. one or more objects comprising that collaborative content object have been previously archived), the changed objects (i.e. objects that have been altered or added), if any, of the collaborative content object may be determined at step 360. At step 370 if there are no changed objects the processing of that collaborative content object may stop and it can be determined, at step 350, if there are additional collaborative content objects on the collaborative content server to process.

If, however, changed objects are detected at step 370 an archive for that collaborative content object may be created at step 380 and stored at step 340. The archive created for these changed objects may comprise only the changed objects along with a structure descriptor comprising information on how those objects relate to the other objects of the collaborative content object (including, if any exist, the relationships between these changed objects and objects of the collaborative content object not in the archive).

Again, as discussed above, in one embodiment, the structural descriptor may comprise an object identifier that associates an object in the archive with the collaborative content object which comprises that object and defines a hierarchical relationship of that object with respect to that collaborative content object or other objects of that collaborative content object. It can then be determined, at step 350, if there are additional collaborative content objects on the collaborative content server to process.

Figure 4A:
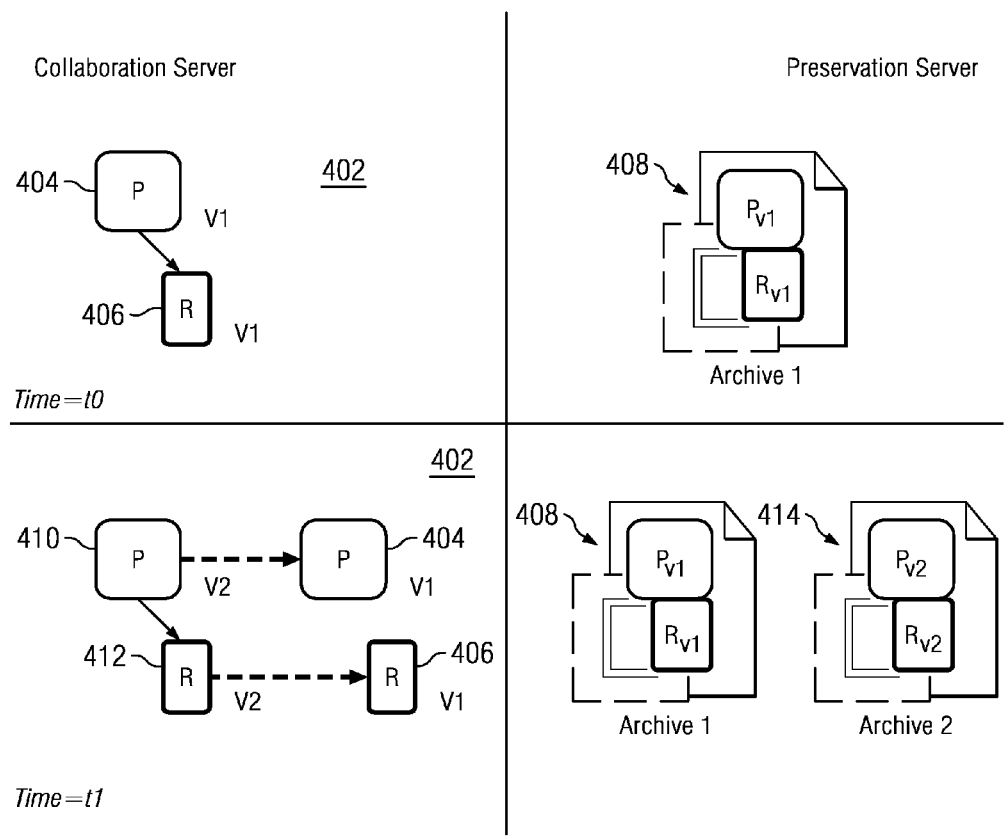
FIGS. 4A-4C illustrate examples of archive creation.
Figure 4B:
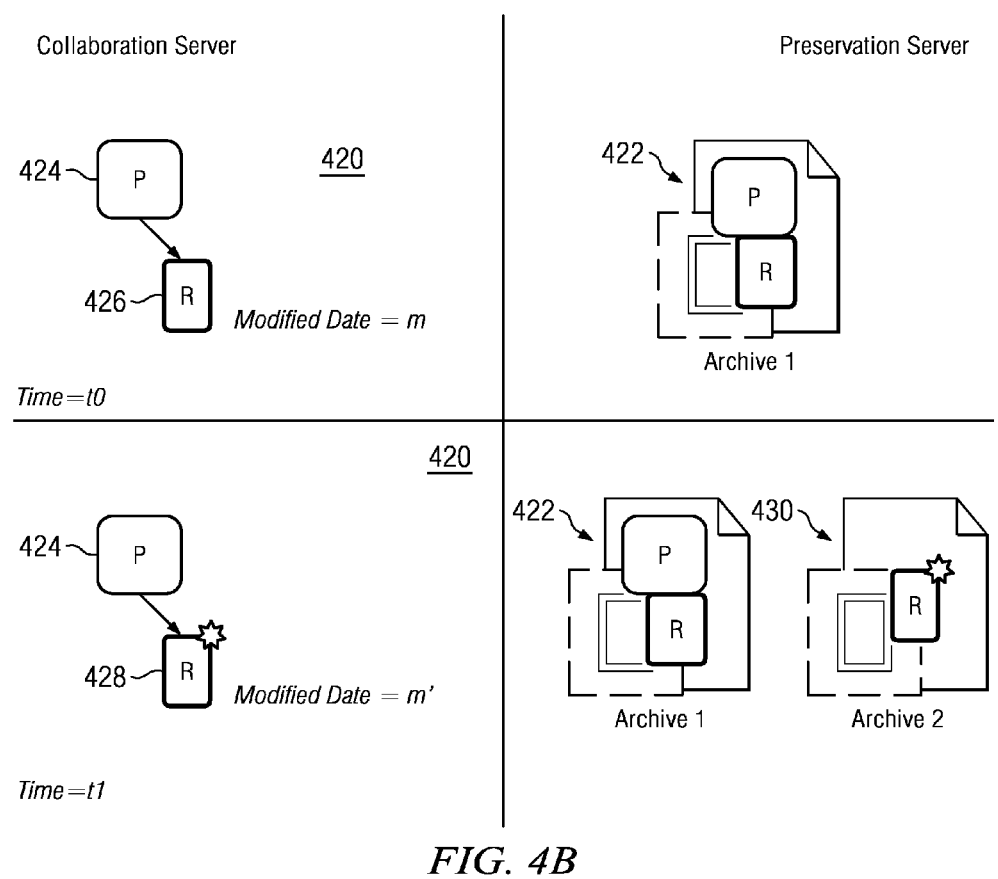
Figure 4C:
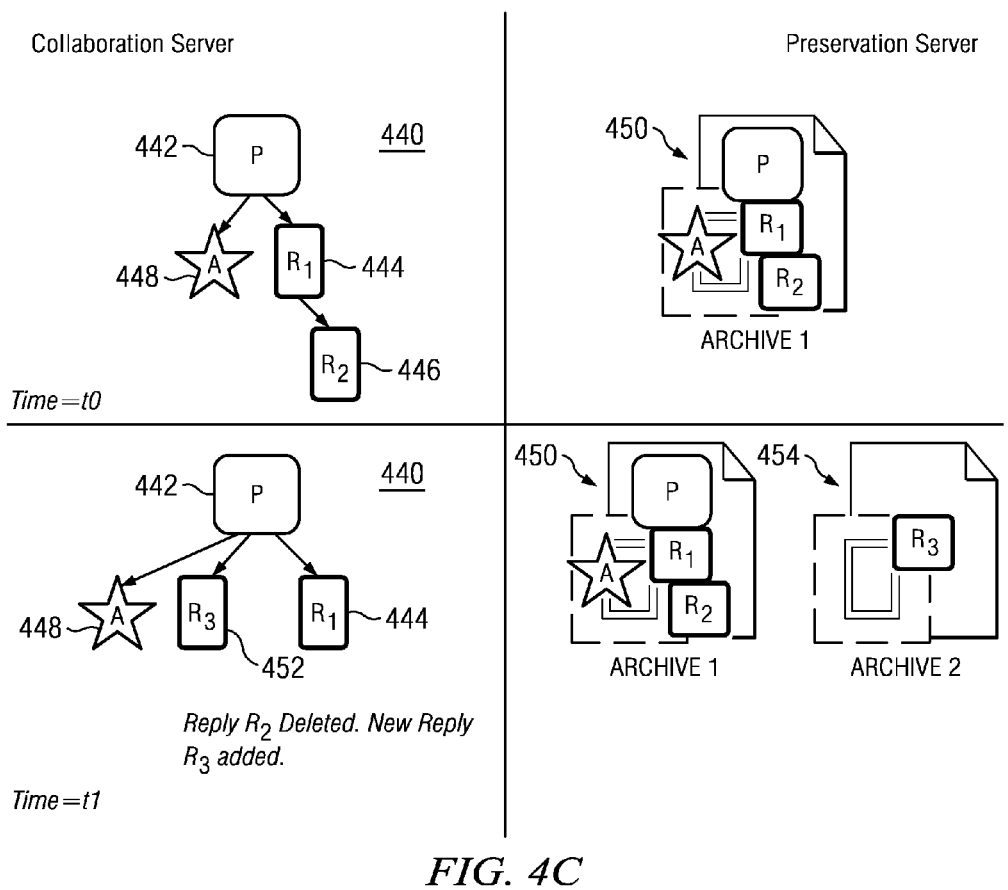

To aid in an understanding of embodiments of methods for the incremental preservation of collaborative content such as that described, attention is briefly directed to FIGS. 4A-4C where various examples of the results of a preservation run being executed on a single collaborative content object at two different time periods are depicted. As depicted in FIG. 4A, at a first time t0, a collaborative content object 402 on a collaboration server comprises a post 404 and a reply 406 thus, when a preservation run at time t0 is completed archive 408 for the collaborative content object on the preservation server may comprise the post 404 and the reply 406. Now suppose that a user revises the post 404 to create revised post 410 (e.g. another version of post 404) and a user revises the reply 406 to create revised reply 412 (e.g. another version of reply 406). When a preservation run at time t1 is completed another archive 414 for the collaborative content object 402 may be created on the preservation server comprising revised post 410 and the revised reply 412.

Moving to FIG. 4B at a first time t0, a collaborative content object 420 on the collaboration server comprises a post 424 and a reply 426 thus, when a preservation run at time t0 is completed archive 422 for the collaborative content object may comprise the post 424 and the reply 426. Now suppose that a user modifies reply 426 to create modified reply 428. When a preservation run at time t1 is completed another archive 430 for the collaborative content object 402 may be created comprising modified reply 426.

Referring now to FIG. 4C, suppose at a first time t0, a collaborative content object 440 on the collaboration server comprises a post 442, a first reply 444, a reply to this first reply 446 and a graphic 448 associated with the post. When a preservation run at time t0 is completed archive 450 for the collaborative content object 440 may comprise the post 442, the first reply 444, the reply to this first reply 446 and the graphic 448 associated with the post. Now suppose that a user deletes the reply 446 and a user adds another reply 452 to the post 442. When a preservation run at time t1 is completed another archive 454 for the collaborative content object 440 may be created comprising newly added reply 452. Note here, however, that even if reply 446 has been deleted from the collaborative content object 440 on the collaboration server, the deleted reply 446 is still preserved in archive 450 created at time t0.

Moving back to FIG. 3B, a flow diagram for one embodiment of a method for forming a review archive from one or more archives is depicted. At step 312 a collection run begins. A collection run is the grouping of archives associated with the same collaborative content object and the formation of a review archive from a plurality of these archives. Initially during a collection run, at step 322 all the archives created by a preservation solution may be determined. In some cases, the storage medium or area of storage medium used to store these archives may be dedicated, such that all archives stored on that storage medium were created by an embodiment of a preservation solution. In these cases such a determination may only involve accessing the storage medium itself. In other cases, however, the storage medium (or area of storage medium) may be shared such that other archives or types of files may be stored on the storage medium. In these types of cases, an embodiment of a preservation solution may store header information in every archive it creates to allow for identification of these archives.

Once the archives are determined, at step 332, they can be grouped according to the collaborative content object to which they are associated. A review archive can then be formed from each grouping of archives at steps 342 and 352. A review archive for a group of objects associated with the same collaborative content object may comprise each of the objects of each archives within the group and a structure descriptor describing the relationships between those objects. The structure descriptor may be created based on the structure descriptors of each archive in a group and the object identifiers of those structure descriptors.

Figure 3C:
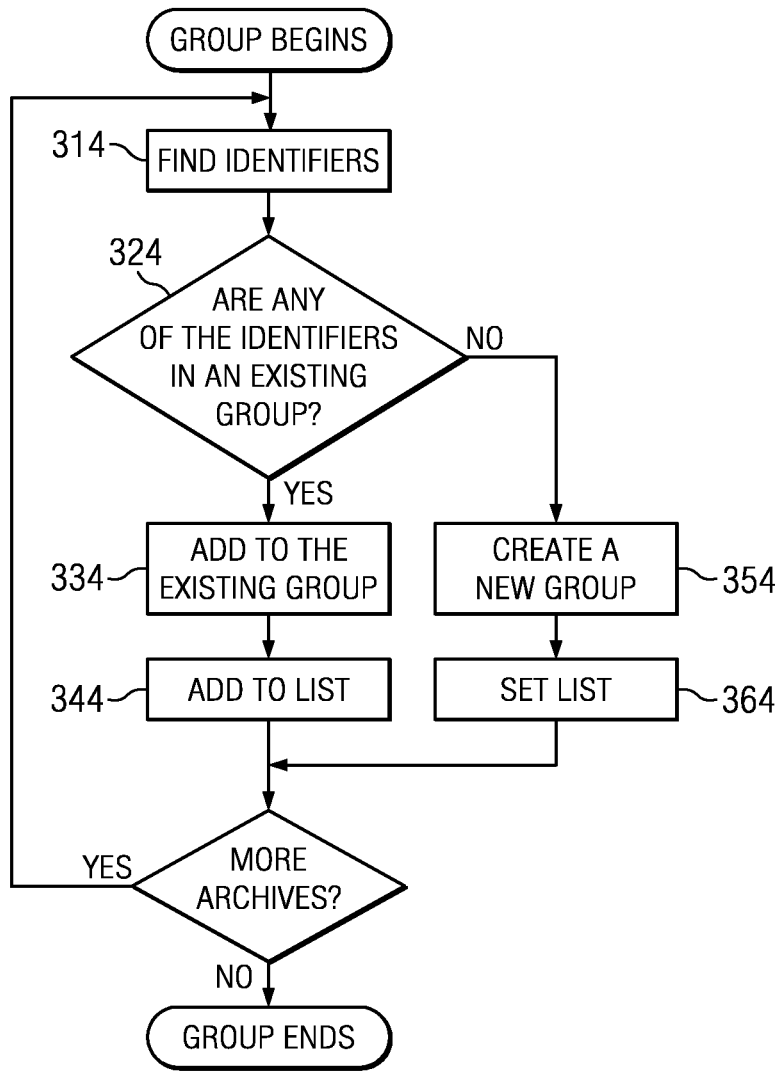
FIG. 3C illustrates a method.

FIG. 3C depicts one embodiment of a method for grouping archives where the structure descriptor of an archive comprises object identifiers. When an archive is accessed, at step 314 all of the unique object identifiers of that archive's structure descriptor may be determined. At step 324 then, it can be determined if any of these object identifiers are associated with an existing archive group based on a list (i.e. some type of record) of object identifiers associated with each archive group. In some embodiments, an identifier for an object may be a super-sequence or a sub-sequence of the identifier of an object to which it is related. So for example, an object corresponding to a blog post may have an object identifier "A" while an object for a reply to that blog post may have the object identifier "A1". Thus, if any of the object identifiers for a particular object are a super-sequence or a sub-sequence of, or the same as, object identifiers associated with an existing group, the archive may be added to that group at step 334 and the object identifiers for that archive added to the associated list of object identifiers for that group at step 344.

If, however, none of the object identifiers of the archive are associated with an existing archive group at step 324 a new archive group may be formed and that archive added to the newly formed archive group at step 354. The list of object identifiers associated with that group is also formed at step 364, where the list comprises the object identifiers associated with that archive. The next archive can then be processed.

At the conclusion of this process then, a set of groups exist, where each group comprises archives related to the same collaborative content objects. A review archive associated with each of these groups may then be formed from the associated archives, as described above.

As has been discussed elsewhere herein, it may be desired that the archives created by embodiments of preservation solutions be renderable on software applications that are commonly installed on computing platforms such as browsers or the like. Additionally, it is desired that when rendered these archives may present a user friendly interface such that a user may easily navigate. To meet both these desires, in some embodiments, the archives created by the preservation system may be in the MHTML format (archives in the MHTML format will be referred to herein interchangeably as an MHTML archive, an MHT or an MHT archive). Furthermore, these MHTs may be structured such that when rendered they may present a layout comprising two frames where one frame presents a table of contents comprising links associated with the individual objects archived, where the relationship of those objects to one another can be easily discerned from the visual relationships of the links to one another. A second presentation frame may be used to present the content or other data about the objects themselves based on a user's interactions with the links presented in the table of contents frame.

Embodiments of such MHTs and the interfaces they may present when rendered will now be discussed in more detail. In order to aid in an understanding of the embodiments of MHTs and interfaces presented herein it will be useful to discuss these embodiments with respect to a particular type of collaborative content. Accordingly, while these embodiments are discussed with respect to a SharePoint collaborative content platform, SharePoint collaborative content objects (and in particular a SharePoint Discussion Thread) and the data associated with this type of collaborative content, it will be understood that these or other embodiments may be utilized in conjunction with other types of collaborative content or other collaborative content platforms with equal efficacy.

Figure 5A:
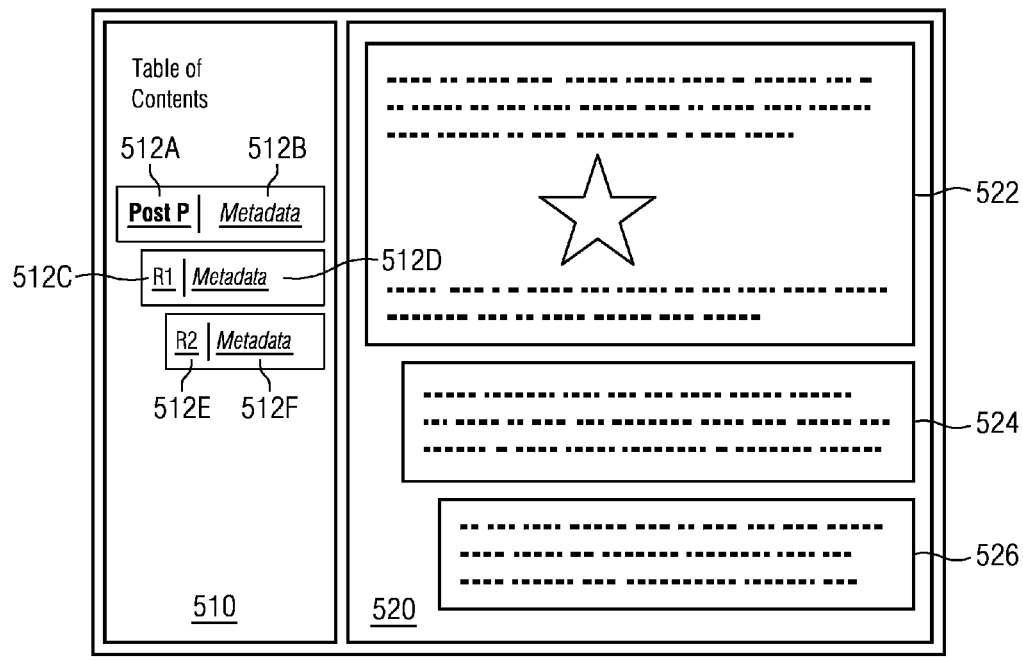
FIGS. 5A-5D illustrate embodiments of interfaces.

Turning first to FIGS. 5A-5D, embodiments of interfaces presented when embodiments of MHTs are rendered by a browser are depicted. Referring first to FIG. 5A, the interface that may be presented in a browser when an MHT archive is rendered comprises table of contents frame 510 and presentation frame 520. Links 512 associated with the objects in the MHT archive are presented in the table of contents frame 510 in a manner which visually depicts the relationships of those objects to one another. Suppose for purposes of this example that an archive was created for a discussion thread comprising an initial post, a reply to the initial post and a reply to the first reply. Here, link 512a (which has been selected in the depicted example) is a link to the first post of a discussion thread post, link 512b is a link to the metadata associated with that post. Links 512c and 512d are links, respectively, to a reply to the initial post of the discussion thread. Links 512c and 512d are indented with respect to links 512a and 512b in table of contents frame 510 to indicate that the reply with which they are associated is a reply to the initial post associated with links 512a and 512b. Similarly, links 512e and 512f are links, respectively, to a reply to the first reply of the discussion thread. Links 512e and 512f are indented with respect to links 512c and 512d in table of contents frame 510 to indicate that the reply with which they are associated is a reply to the first reply associated with links 512c and 512d.

Figure 5B:
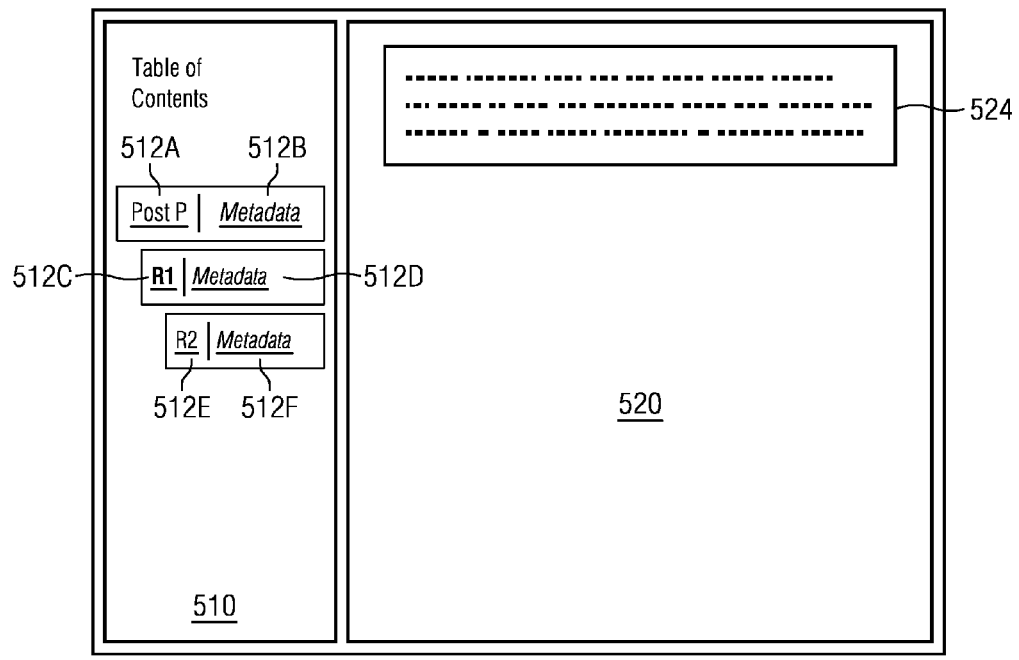
Figure 5C:
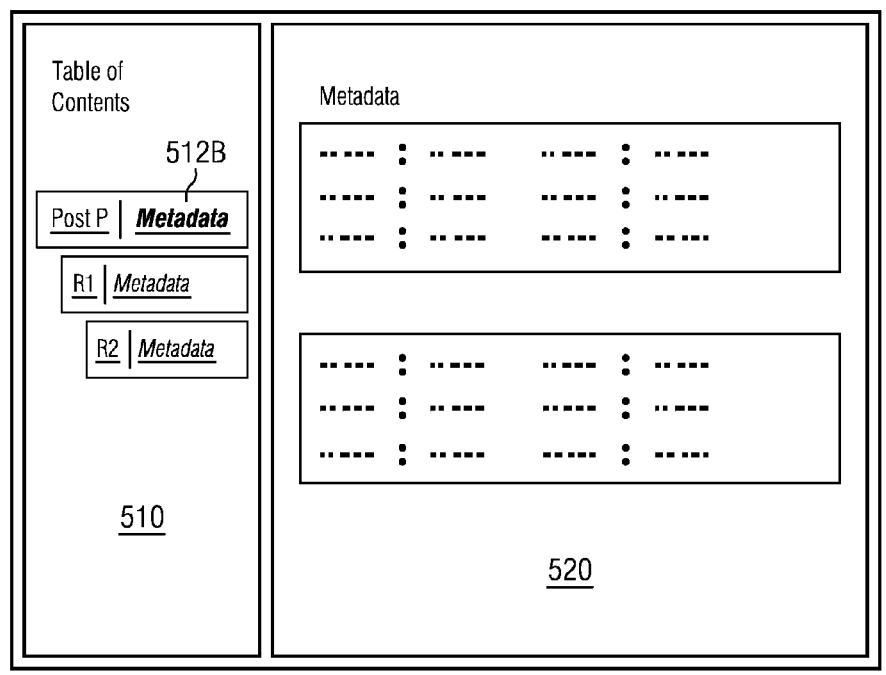

Thus, when a user interacts with the links 512 presented in table of contents frame 510 data associated with the link may be presented in the presentation frame 520. Here, the user has selected link 512a for the initial post, and the post 522, the first reply 524 and the reply to that reply 526 are presented in the presentation frame 520. Now suppose the user selects link 512c. FIG. 5B depicts the interface that results from this action. Here, as can be seen, link 512c has been activated and the first reply 524 is presented in presentation frame 520. Similarly, suppose the user selects link 512b. FIG. 5C depicts the interface that results. In this instance, metadata associated with the post is presented in presentation frame 520.

Embodiments of such an interface may be extremely flexible, and allow the presentation of a variety of different data and links to such data to be easily integrated into the table of contents frame 510 in a manner which visually presents the relationship between the objects or data associated with those links. For example, suppose that in addition to the initial post, a reply to the initial post and a reply to the first reply, the initial post has been revised twice and the reply to the first reply has been revised once. In this case an MHT may be created for a discussion thread comprising an initial post, the two past versions of the initial post, a reply to the initial post, a reply to the first reply and the past version of the reply to the first reply.

Figure 5D:
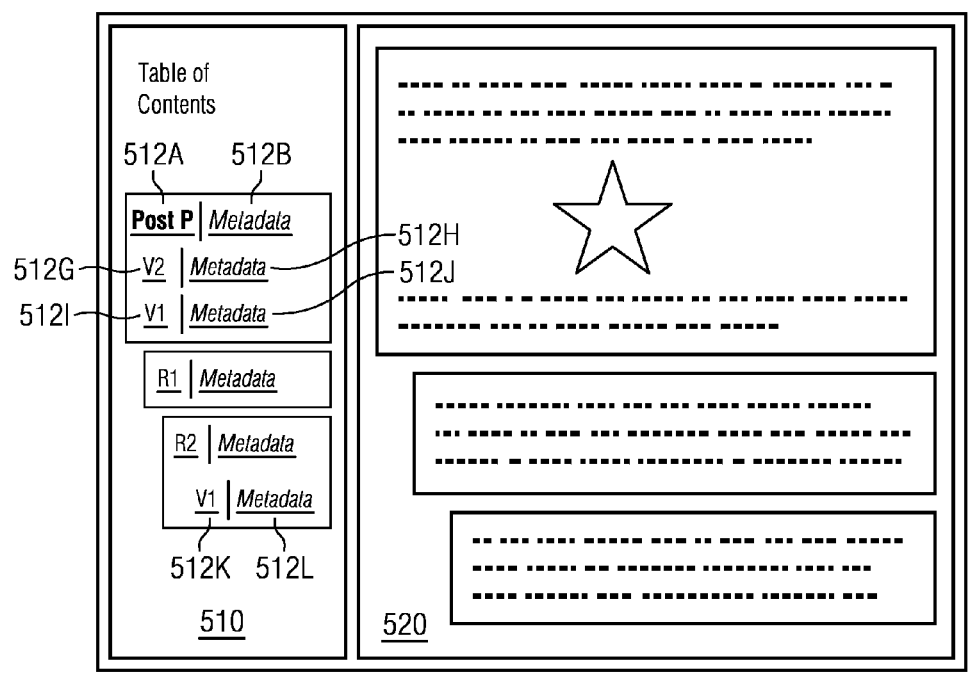

FIG. 5D depicts an embodiment of an interface that may result from a rendering of this MHT. Here, link 512a (which has been selected in the depicted example) is a link to the current (latest) version of the first post of a discussion thread while link 512b is a link to the metadata associated with that post. Additionally, links 512g and 512h are links, respectively, to the second version of the post and metadata associated with the second version and links 512i and 512j are links, respectively, to the first version of the post and metadata associated with the first version of the post. Similarly, links 512k and 512l are links to the first version of the reply to the first reply.

In order to present an interface such as those described with respect to FIGS. 5A-5D embodiments of an MHT may be constructed for a collaborative content object that when rendered produce such an interface. In an abstract sense, an MHT may be considered a web page compacted into a single archive file in such a way that all linked resources from this web page are also packed into the archive. Every MHT therefore has a "root resource", sometimes also known as the body, which is the default view (or home page) displayed when the MHT is opened in a browser. This "root resource" then has hyperlinks in its content to other objects (for example other web pages) also included into the MHT ("linked resources"). Each linked resource will have a unique identifier (a "Content-ID") that will be used to address it within the MHT. An MHT therefore has a root resource and all the linked resources, and the content of the resources may have links to the linked resources, such that the links employ Content-IDs assigned to the linked resources to address them.

Figure 6A:
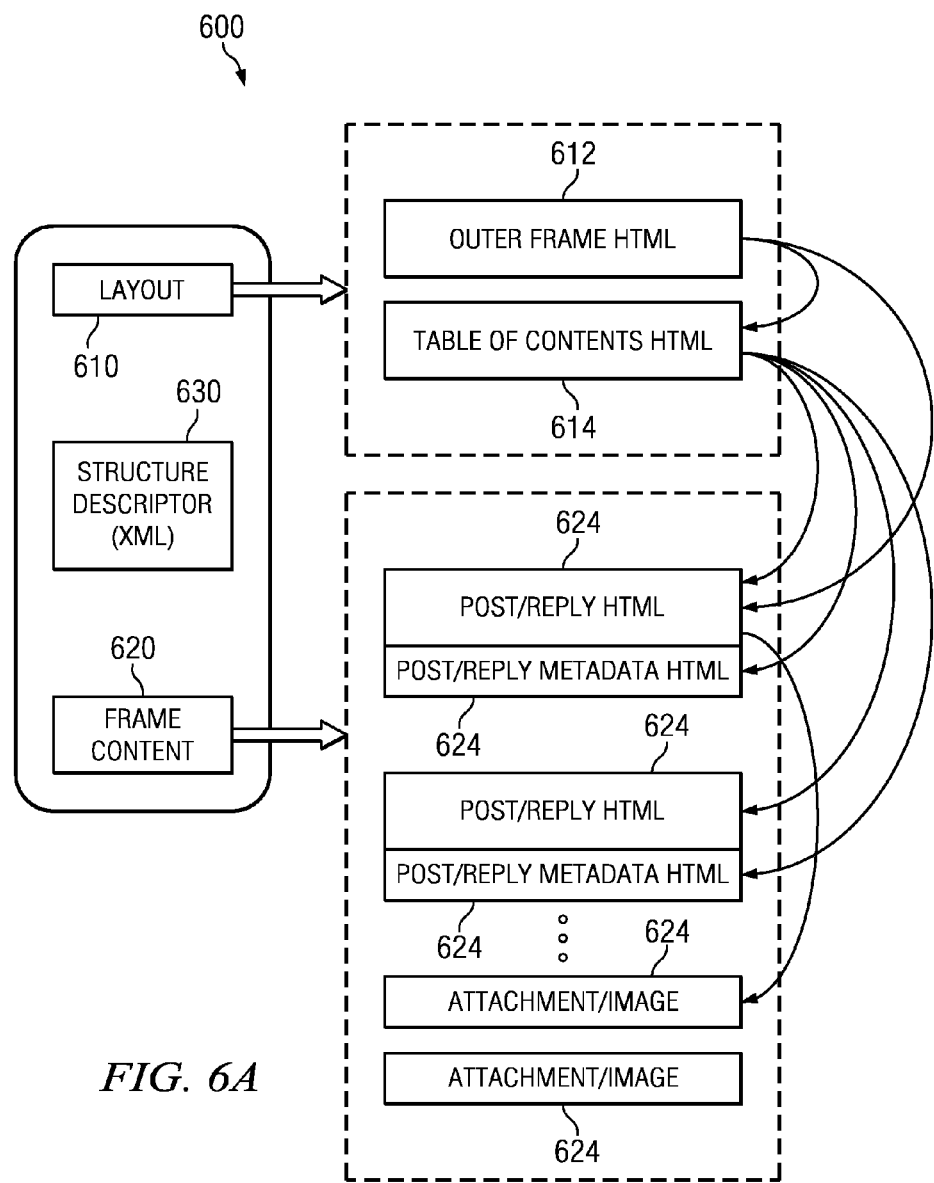
FIG. 6A illustrates an embodiment of an archive.

One embodiment of a structure for an MHT archive that produces an interface with a navigation frame and a presentation frame when rendered is depicted in FIG. 6. The MHT 600 comprises a layout portion 610, the presentation frame content portion 620 and an XML structure descriptor 630.

The layout displayed in the web browser when MHT 600 is rendered comprises a skeleton carrying two frames—the presentation frame on the right-side of the layout (for example, presentation frame 520 in FIGS. 5A-5D) and the table of contents frame on the left side of the layout. This skeleton framework is stored in layout portion 610 as HTML called Outer Frame HTML 612.

Table of contents HTML 614 comprises the HTML for the table of content frame on the left side of the layout. Frame content portion 612 contains a link to the objects 624 to be presented in the presentation frame of the layout (e.g. the HTML of a post or reply, metadata HTML for a post or reply, attachments or images associated with a post or reply, etc.).

Structure descriptor 630 comprises XML describing the objects 624 of the MHT. This XML may describe the relationships between the objects 624 and may identify the location of the content of the object 624 or metadata for the object 624 within the MHT. The location of objects may be identified by assigning Content-IDs as identifiers for all objects (and associated metadata if it exists) 624 in the MHT, the table of contents 614 and the structure descriptor 630. For example, a serial number (1, 2, 3 . . . ) may be used to assign Content-IDs unique to the MHT.

Thus, here, the root resource of MHT 600 is the Outer Frame HTML 612. The objects 624 within the frame content portion 612, the table of contents 614 and the structure descriptor 630 then become the linked resources. The outer frame HTML 612 basically links to the table of contents HTML 614 to render the table of contents frame in the left-side of the display.

FIG. 6B shows a snippet of an example of outer frame HTML 612. Here, the table of contents html 614 has the Content-ID "000001.html". HTML 662 shows that the frame sources its content from this html.

Similarly, HTML 664 identifies the definition for the presentation frame, which will display any content selected to be viewed by a user using the table of contents frame. It sources from the Content-ID "000002.html", which in this case is HTML carrying the content of the archived post. Note that the name of this frame ("id") is set to "file".

Moving to FIG. 6C, which depicts the table of contents HTML 614 for the same MHT as that depicted in FIG. 6B, the links in the table of contents all have their targets set to the frame named "file". This implies that when they are clicked on, the browser will render the linked content in the presentation frame. Also notice how the Content-IDs used in the "href" argument in the HTML are serial numbers from "000002" through "000007". Each Content-ID represents an HTML page that can be rendered by clicking on the corresponding hyperlink.

It will be noted then, that table of contents HTML 614 ties together all the objects in the MHT that may be visible when the MHT is rendered. Note that in some embodiments, the table of contents HTML 614 may not link to the structure descriptor XML 630. This may help to ensure that a user to whom the MHT is rendered can never inadvertently view the same. However, structure descriptor XML 630 may always be assigned the last Content-ID in the MHT 600, ensuring ready access to any application that is capable of rendering or parsing an MHT.

Figure 7A:
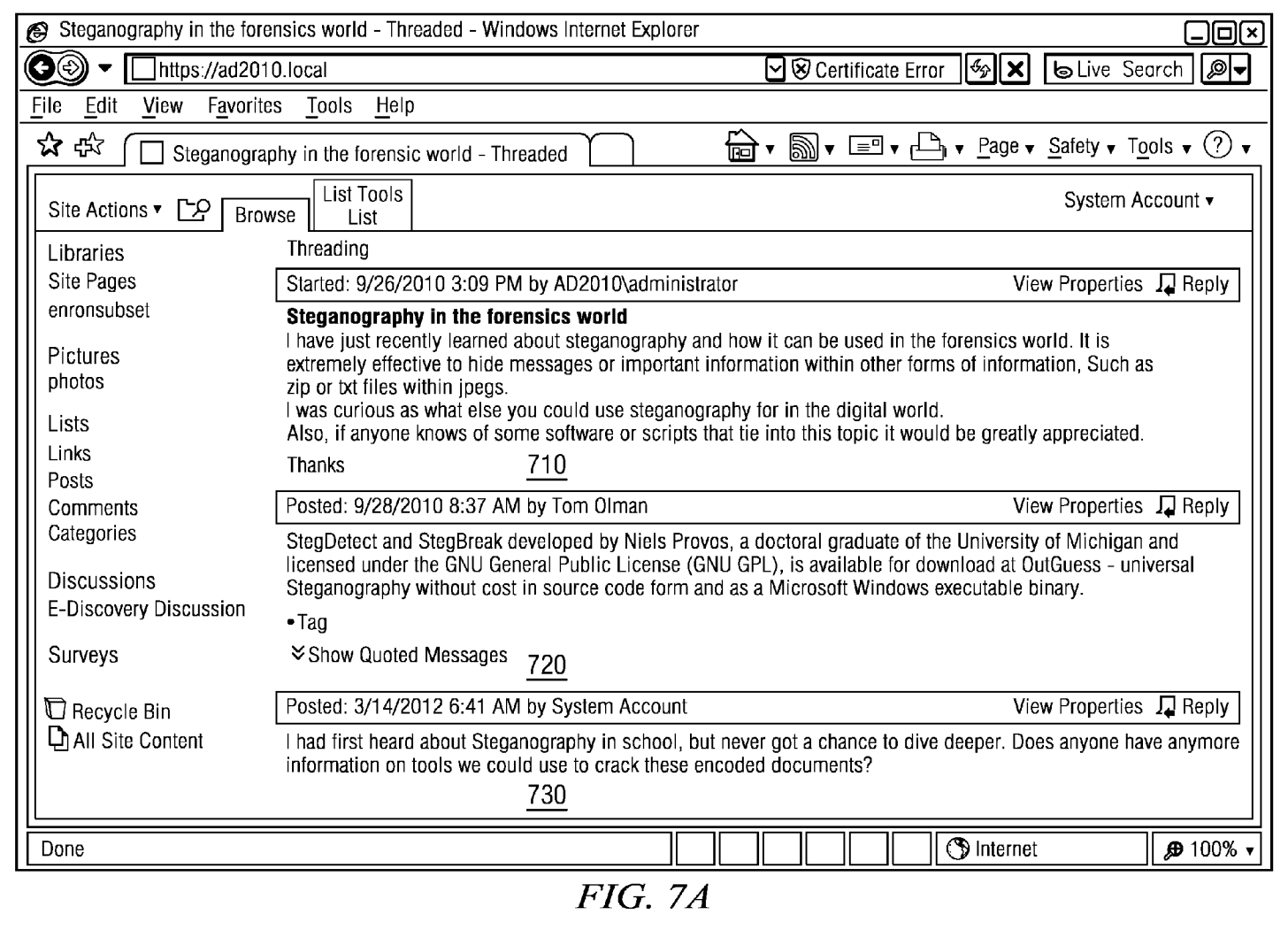

It will be useful to an understanding of various embodiments presented herein to describe an example. With that in mind, attention is now directed first to FIG. 7A. FIG. 7, depicts a SharePoint discussion thread where the thread comprises an initial post 710, a first reply 720 (by Tom Olman) and a reply to the first reply 730 (by System Account).

Thus, a preservation run may be executed by a preservation system at a first time (time t0). Using the SharePoint Web Services API, specifically the Lists Web Service, a GetLis-tItemsRequest (e.g. with the folder parameter of the query options set to empty) may be issued to obtain the post from a SharePoint server. The replies to the post and any metadata for the post and replies can also be obtained by issuing a GetListItemsRequest. For example, the XML received from a SharePoint server for the first post in the discussion thread of FIG. 7A is:

<?xml version="1.0" encoding="utf-8" ?>-<soap:Envelope xmlns:soap="http://schemas.xmlsoap.org/soap/envelope/" xmlns:xsd="http://www.w3.org/2001/XMLSchema" xmlns:xsi="http://www.w3.org/2001/XMLSchema-instance">
-<soap:Body>
-<GetListItemsResponse xmlns="http://schemas.microsoft.com/sharepoint/soap/">
-<GetListItemsResult>
-<listitems xmlns:dt="uuid:C2F41010-65B3-11d1-A29F-00AA00C14882" xmlns:rs="urn:schemas-microsoft-com:rowset" xmlns:s="uuid:BDC6E3F0-6DA3-11d1-A2A3-00AA00C14882" xmlns:z="#RowsetSchema">
-<rs:data ItemCount="1"> <z:row ows_Attachments="0" ows_Author="1;#AD2010\administrator" ows_BaseName="Steganography in the forensics world" ows_Body="<div class="ExternalClassAC8397562E164497B7566EDA0241-5A18"><p>I have just recently learned about steganography and how it can be used in the forensics world. It is extremely effective to hide messages or important information within other forms of information. Such as zip or txt files within jpegs.<br />I was curious as what what else you could use steganography for in the digital world.<br />Also, if anyone knows of some software or scripts that tie into this topic it would be greatly appreciated.<br /><br />Thanks </p></div>"ows_BodyAndMore="<div class="ExternalClassAC8397562E164497B7566EDA02415A18"><p>I have just recently learned about steganography and how it can be used in the forensics world. It is extremely effective to hide messages or important information within other forms of information. Such as zip or txt files within jpegs.<br />I was curious as what what else you could use steganography for in the digital world.<br />Also, if anyone knows of some software or scripts that tie into this topic it would be greatly appreciated.<br /><br />Thanks </p></div>" ows_BodyWasExpanded="{E62C3993-982E-403D-93A0-0FF64A4A7EE9}"ows_ContentType="Discussion" ows_ContentTypeId="0x012002002E5FDAE09B7BE94886411E65EEE33F0B" ows_Created="2010-09-26T20:09:39Z" ows_Created_x0020_Date="9;#2010-09-26T20:09:39Z" ows_DiscussionLastUpdated="2010-09-28T13:37:48Z" ows_Editor="1;#AD2010\administrator" ows_EncodedAbsUrl="http://shpt.ad2010.local/sites/teamblog/Lists/EDiscovery %20Discussion/Steganography %20in %20the % 20forensics %20world" ows_FSGObjType="9;#1" ows_FileDirRef="9;#sites/teamblog/Lists/EDiscovery Discussion" ows_FileLeafRef="9;#Steganography in the forensics world" ows_FileRef="9;#sites/teamblog/Lists/EDiscovery Discussion/Steganography in the forensics world" ows_FolderChildCount="9;#0" ows_FullBody="<div class="ExternalClassAC8397562E164497B7566ED-A02415A18"><p>I have just recently learned about steganography and how it can be used in the forensics world. It is extremely effective to hide messages or important information within other forms of information. Such as zip or txt files within jpegs.<br />I was curious as what what else you could use steganography for in the digital world.<br />Also, if anyone knows of some software or scripts that tie into this topic it would be greatly appreciated.<br /><br />Thanks </p></div>" ows_GUID="{E62C3993-982E-403D-93A0-

0FF64A4A7EE9}" ows_ID="9" ows_IndentLevel="0x01-CD2BCDE282314C3A46CD0843B38A39D4B8B36FD0D-A" ows_Indentation="0x01CD2BCDE282314C3A46CD-0843B38A39D4B8B36FD0DA" ows_IsRootPost="1" ows_ItemChildCount="9;#1" ows_Last x0020 Modified="9;#2010-09-28T13:37:47Z" ows_LessLink="9" ows_LimitedBody="<div class="ExternalClassAC8397562E1644-97B7566EDA02415A18"><p>I have just recently learned about steganography and how it can be used in the forensics world. It is extremely effective to hide messages or important information within other forms of information. Such as zip or txt files within jpegs.<br />I was curious as what what else you could use steganography for in the digital world.<br />Also, if anyone knows of some software or scripts that tie into this topic it would be greatly appreciated.<br /><br />Thanks </p></div>" ows_LinkDiscussionTitle="Steganography in the forensics world" ows_LinkDiscussionTitle2="Steganography in the forensics world" ows_LinkDiscussionTitleNoMenu="Steganography in the forensics world" ows_LinkFilename="Steganography in the forensics world" ows_LinkFilename2="Steganography in the forensics world" ows_LinkFilenameNoMenu="Steganography in the forensics world" ows_LinkTitle="Steganography in the forensics world" ows_LinkTitle2="Steganography in the forensics world" ows_LinkTitleNoMenu= "Stegano-graphy in the forensics world" ows MessageBody= "<div class="ExternalClassAC8397562E164497B7566-EDA02415A18"><p>I have just recently learned about steganography and how it can be used in the forensics world. It is extremely effective to hide messages or important information within other forms of information. Such as zip or txt files within jpegs.<br />I was curious as what what else you could use steganography for in the digital world.<br />Also, if anyone knows of some software or scripts that tie into this topic it would be greatly appreciated.<br /><br />Thanks </p></div>" ows_MessageId="<a59d272d918c41188758-1058d6408bab@SharePoi nt>" ows_MetaInfo="9;#" ows_Modified="2010-09-26T20:09:39Z" ows_MoreLink="9" ows_MyEditor="1;#AD2010\administrator" ows_Order="900.000000000000" ows_PermMask="0x7fffffffffffffff" ows_PersonImage="AD2010\administrator" ows_PersonViewMinimal="AD2010\administrator" ows_ProgId="9;#" ows QuotedTextWasExpanded="{E62C3993-982E-403D-93A0-0FF64A4A7EE9}" ows_ReplyNoGif="sites/teamblog/Lists/EDiscovery Discussion" ows_ScopeId="9; #{2E915B41-A91F-4E48-9CE7-4900C5AC99D3}" ows_SelectTitle="9" ows_ServerUrl="/sites/teamblog/Lists/EDiscovery Discussion/Steganography in the forensics world" ows SortBehavior="9;#1" ows StatusBar="2010-09-26T20:09:39Z" ows_ThreadIndex="0x01CD2BCDE2823-14C3A46CD0843B38A39D4B8B36FD0DA" ows_Threading= "0x01CD2BCDE282314C3A46CD0843B38A39D4B-8B36F D0DA" ows_ThreadingControls="0x01CD2BCDE-282314C3A46CD0843B38A39 D4B8B36FD0DA" ows Title="Steganography in the forensics world" ows ToggleQuotedText="9" ows_UniqueId="9;#{B10881577-71EE-4C4E-A790-47EE0C7CEFDD}" ows_WorkflowVersion="1" ows_EditMenuTableEnd="9" ows_EditMenuTableStart="Steganography in the forensics world" ows_EditMenuTableStart2="9" ows_IsCurrentVersion="1" ows_Level="1" ows_ModerationStatus="0" ows_UIVersion="512" ows_UIVersionString="1.0" ows_owshiddenversion="1" />
</rs:data>
</listitems>
</GetListItemsResult>
</GetListItemsResponse>
</soap:Body>
</soap:Envelope>

Note the following parameter from the returned XML:
ows_ThreadIndex="0x01CD2BCDE282314C3A46CD084-3B38A39D4B8B36FD0DA"

The ThreadIndex is a unique identifier for any component of a discussion thread on SharePoint.

Similar responses may be retrieved for replies as well. These replies also have ThreadIndexes like the post. In this particular example, the following values for the ThreadIndex parameter are:
Reply 720 (by Tom Olman):
ows_ThreadIndex="0x01CD2BCDE282314C3A46CD084-3B38A39D4B8B36FD0DA0056E5D412"
Reply 730 (by System Account) to Reply 720:
ows_ThreadIndex="0x01CD2BCDE282314C3A46CD084-3B38A39D4B8B36FD0DA0056E5D41268B14764EE"

Note how the ThreadIndex values grow in length with increasing depth in the discussion thread. Additionally, note that the ThreadIndex for Reply 720 is a super-sequence of the ThreadIndex for the original post 710. Similarly, the ThreadIndex for Reply 730 is a super-sequence of the ThreadIndex for Reply 720, and in turn of the original post 710. In general, the ThreadIndex of any object is a sub-sequence of all responses that follow it in the hierarchy of the discussion thread. Accordingly, two objects at the same level in the hierarchy of a discussion thread will have a ThreadIndex of the same length. The ThreadIndex can therefore be used to infer relationships among components of the conversation and therefore the structure of the conversation as a whole.

The ThreadIndex may also be stored in an index kept for each of the objects seen. Thus, as initially none of the ThreadIndexes for the objects of this discussion thread are in the index maintained by the embodiment of the preservation solution, it can be determined that none of the objects of this discussion thread have been previously archived using the ThreadIndexes for post 710 and replies 720, 730. The identifiers for the objects of the Threaded Discussion may be added to the index. As an example, the entries for the index associated with post 710, and replies 720, 730 are depicted in FIG. 7B.

Additionally, an MHT for this Threaded Discussion may then be created and saved. The HTML comprising the outer frame HTML for MHT created for the example discussion thread at time t0 (referred to for purposes of this example as MHT t0) may therefore be:
<html>
<head>
<meta http-equiv="Content-Type" content="text/html; charset=UTF-8">
<title>StoredIQ-Steganography in the forensics world</title>
</head>
<body>
<div id="viewerTable" class="hidden">
<table width="98%" height="100%" cellpadding="0" border="0" align="center">
<tr>
<td width="360" valign="top">
<div><h3>Table of Contents:</h3></div>
<iframe src="cid:000001.html" style="margin-top: 5px;" name="toc" align="middle" height="480" width="310" scrolling="auto" id="entities" frameborder="0">
</iframe>
</td>
<td width="8"><img src="images/spacer.gif" width="8" height="1"></td>

```
<td width="100%" valign="top" id="fileCell" class="SectionBlocks">
<table width="100%" cellpadding="0" cellspacing="0" border="0">
<tr>
<td><div><h3>Steganography in the forensics world</h3></div></td>
</tr>
</table>
<div class="RegularText" style="align:center;text-align: center" id="pageNumberCell"> <br> </div><iframe src="cid:000002.htm" style="margin-top: 5px;border: 1px solid #e7e7e7;" name="file" align="center" height="480" width="98%" scrolling="auto" id="file" frameborder="0">
</iframe>
</td>
</tr>
</table>
</div>
</body>
</html>
```

The HTML comprising the table of contents HTML for MHT t0 may therefore be:

```
<html>
<head>
<meta http-equiv="Content-Type" content="text/html; charset=utf-8"><style>body {font: 11px/1.231 arial, helvetica, clean, sans-serif;}h3 {font-size: 14px; margin-bottom: 0;}h4 {font-size: 13px; margin-bottom: 0;}h5 {font-size: 12px; margin-bottom: 0;}ul.native {list-style: square none outside; margin: 4px 20px; font: 11px/1.231 arial, helvetica, clean, sans-serif;}ul.additional {list-style: none outside; margin: 4px 5px; font: 11px/1.231 arial, helvetica, clean, sans-serif;}ul.versions {list-style: none outside; list-style-image: none; margin: 2px 17px; font: 11px/1.231 arial, helvetica, clean, sans-serif;}ul li a {margin-left: 2px; vertical-align: top;}ul.versions a {margin-left: 0;}li.additional_label {font-style: italic;}li a.current_file {background-color: yellow;}span.spacer {color: #999;}li a.metadata {color: #5555ee;}</style></head><body bgcolor="#ffffff" leftmargin="0" topmargin="0" marginwidth="0" marginheight="0">
<h3>Discussion Thread:</h3>
<ul class="native">
<li>
<a href="cid:000002.htm" target="file">Steganography in the forensics world</a> <span class="spacer">|</span> <a href="cid:000003.html" class="metadata" target="file">Metadata</a>
</li>
</ul>
<br><br>
<div><h4>Replies and attachments:</h4></div>
<ul class="native">
<li>
<a href="cid:000004.htm" target="file">Tom Olman-10.repl</a> <span class="spacer">|</span> <a href="cid:000005.html" class="metadata" target="file">Metadata</a>
</li>
</ul>
<ul>
<ul class="native">
<li>
<a href="cid:000006.htm" target="file">System Account-41.repl</a> <span class="spacer">|</span> <a href="cid:000007.html" class="metadata" target="file">Metadata</a>
</li>
</ul>
</ul>
<hr>
</body></html>
```

The XML for the structure descriptor of the MHT t0 may be:

```
<?xml version="1.0" encoding="utf-8" ?>
-<StoredIQMHTMLStructure Version="1.2">
 -<MHTML>
    <ListTemplateId>108</ListTemplateId>
  </MHTML>
 -<StructureAndProperties>
  -<FirstOrderObject CID="000002.htm">
   -<Properties>
     <ObjectType>10005</ObjectType>
     <ObjectName>Steganography in the forensics world-.disc</ObjectName>
     <ObjectURL>http://shpt.ad2010.local/sites/teamblog/List s/EDiscovery Discussion/Steganography in the forensics world</ObjectURL>
     <Stat fs_atime="1285531779" fs_ctime="1285531779" fs_dev="11" fs_inode="45" fs_mode="32768" fs_mtime="1285531779" fs_nlink="1" group_id="N/A" owner_id="AD2010\administrator" size="535" />
     <ObjectHash md5="0x4daec34d41075afc511b194db91c8147" sha1="0x05c6e6b169f133145cc9082522e0491a2c0fa-3af" />
     <ObjectDocId>01CD2BCDE282314C3A46CD0843B3-8A39D4B8B36FD0 DA</ObjectDocId>
     <MetadataCID>000003.html</MetadataCID>
    </Properties>
   -<SubStructure>
    -<SubObject CID="000004.htm" ContainerPath="Tom Olman-10.repl">
     -<Properties>
       <ObjectType>10006</ObjectType>
       <ObjectName>Tom Olman-10.repl</ObjectName>
       <ObjectURL>http://shpt.ad2010.local/sites/teamblog/List s/EDiscovery Discussion/Steganography in the forensics world/10_0.000</ObjectURL>
       <Stat fs_atime="1285681068" fs_ctime="1285681068" fs_dev="11" fs_inode="45" fs_mode="32768" fs_mtime="1285681068" fs_nlink="1" group_id="N/A" owner_id="Tom Olman" size="1210" />
       <ObjectHash md5="" shat="" />
       <ObjectDocId>01CD2BCDE282314C3A46CD0843B3-8A39D4B8B36FD0 DA0056E5D412</ObjectDocId>
       <MetadataCID>000005.html</MetadataCID>
      </Properties>
     -<SubStructure>
     -<SubObject CID="000006.htm" ContainerPath="Tom Olman-10.repl/System Account-41.repl">
      -<Properties>
        <ObjectType>10006</ObjectType>
        <ObjectName>System Account-41.repl</ObjectName>
        <ObjectURL>http://shpt.ad2010.local/sites/teamblog/List s/EDiscovery Discussion/Steganography in the forensics world/41_0.000</ObjectURL>
        <Stat fs_atime="1331725315" fs_ctime="1331725315" fs_dev="11" fs_inode="45" fs_mode="32768" fs_mtime="1331725315" fs_nlink="1" group_id="N/A" owner_id="System Account" size="1643" />
        <ObjectHash md5="" shat="" />
        <ObjectDocId>01CD2BCDE282314C3A46CD0843B3-8A39D4B8B36FD0 DA0056E5D41268B14764EE</ObjectDocId>
```

```
<MetadataCID>000007.html</MetadataCID>
</Properties>
</SubObject>
</SubStructure>
</SubObject>
</SubStructure>
</FirstOrderObject>
</StructureAndProperties>
</StoredIQMHTMLStructure>
```

Note how this XML has a FirstOrderObject with an element called SubStructure defining the structure of everything below it in the hierarchy. The SubStructure then has a SubObject corresponding to Reply 720, which in turn has its own SubStructure containing a SubObject corresponding to Reply 730. Also note that one of the Properties for each Object in the XML is called ObjectDocId, and it holds the unique identifier for each object in the discussion thread.

Continuing with the above example, suppose now after the initial preservation run the user Tom adds another reply 740 to his own earlier reply 720 at the same level as reply 730 as depicted in FIG. 7C. When the next preservation run is subsequently begun (time t1), the post, replies to the post and any metadata for the post and replies can again be obtained by issuing a GetListItemsRequest.

In this particular example, in addition to XML associated with post 710, and replies 720, 730, the response from the SharePoint server returns XML associated with reply 740 with the ThreadIndex in the XML response set to:
ows_ThreadIndex="0x01CD2BCDE282314C3A46CD084-3B38A39D4B8B36FD0DA0056E5D41268B3FA32B4"

Note how this ThreadIndex is a super-sequence of the ThreadIndex for the original Post, as well as that for Reply 720. It is also the same length as the ThreadIndex for Reply 730. This indicates reply 740 is at the same level in the discussion thread hierarchy as reply 730, and is additionally a reply made in response to reply 720.

By comparing the unique identifiers returned from the SharePoint server with the unique identifiers for each individual thread object stored in the index earlier a determination can be made that post 710 and replies 720 and 730 have been previously archived. Similarly, a determination can be made that reply 740 has not been previously archived.

Figure 7E:
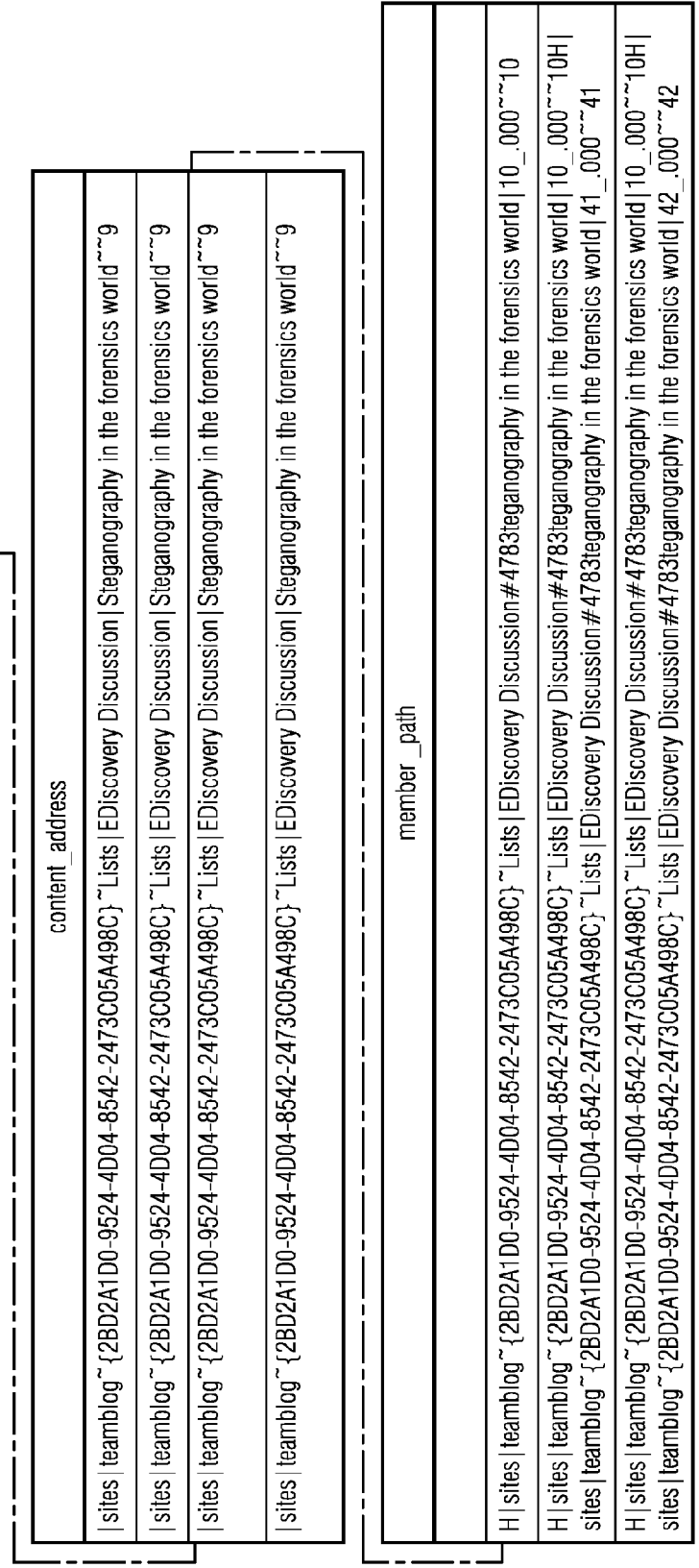

An MHT associated with this Threaded Discussion may then be created and saved. However, in this instance as post 710 and replies 720 and 730 have previously been archived, the MHT created at time t1 (referred to for purposes of this example as MHT t1) may only comprise reply 740. An identifier for reply 740 may also be added to the index. Thus, the state of the index after the addition of the identifier for reply 740 is depicted in FIGS. 7D and 7E.

The HTML comprising the outer frame HTML for MHT t1 may therefore be:

```
<html>
<head>
<meta http-equiv="Content-Type" content="text/html; charset=UTF-8">
<title>StoredIQ-</title>
</head>
<body>
<div id="viewerTable" class="hidden">
<table width="98%" height="100%" cellpadding="0" border="0" align="center">
<tr>
<td width="360" valign="top">
<div><h3>Table of Contents:</h3></div>
<iframe src="cid:000001.html" style="margin-top: 5px;" name="toc" align="middle" height="480" width="310" scrolling="auto" id="entities" frameborder="0">
</iframe>
</td>
<td width="8"><img src="images/spacer.gif" width="8" height="1"></td>
<td width="100%" valign="top" id="fileCell" class="SectionBlocks">
<table width="100%" cellpadding="0" cellspacing="0" border="0">
<tr>
<td><div><h3></h3></div></td>
</tr>
</table>
<div class="RegularText" style="align:center;text-align: center" id="pageNumberCell"> <br> </div>
<iframe src="cid:000002.htm" style="margin-top: 5px;border: 1px solid #e7e7e7;" name="file" align="center" height="480" width="98%" scrolling="auto" id="file" frameborder="0"></iframe>
</td>
</tr>
</table>
</div>
</body>
</html>
```

The HTML comprising the table of contents HTML for MHT t1 may be:

```
<html>
<head>
<meta http-equiv="Content-Type" content="text/html; charset=utf-8"><style>body {font: 11px/1.231 arial, helvetica, clean, sans-serif;}h3 {font-size: 14px; margin-bottom: 0;}h4 {font-size: 13px; margin-bottom: 0;}h5 {font-size: 12px; margin-bottom: 0;}ul.native {list-style: square none outside; margin: 4px 20px; font: 11px/1.231 arial, helvetica, clean, sans-serif;}ul.additional {list-style: none outside; margin: 4px 5px; font: 11px/1.231 arial, helvetica, clean, sans-serif;}ul.versions {list-style: none outside; list-style-image: none; margin: 2px 17px; font: 11px/1.231 arial, helvetica, clean, sans-serif;}ul li a {margin-left: 2px; vertical-align: top;}ul.versions a {margin-left: 0;}li.additional_label {font-style: italic;}li a.current_file {background-color: yellow;}span.spacer {color: #999;}li a.metadata {color: #5555ee;}</style></head><body bgcolor="#ffffff" leftmargin="0" topmargin="0" marginwidth="0" marginheight="0">
<h3>Discussion Thread:</h3>
<ul class="native">
<li>
</li>
</ul>
<br><br>
<div><h4>Replies and attachments:</h4></div>
<ul class="native">
<li>
<a href="cid:000003.htm" target="file">Tom Olman-42.repl</a>
<span class="spacer">|</span> <a href="cid:000004.html" class="metadata" target="file">Metadata</a>
</li>
</ul>
<hr>
</body>
</html>
```

The XML for the structure descriptor of MHT t1 may therefore be:

```
<?xml version="1.0" encoding="utf-8" ?>
-<StoredIQMHTMLStructure Version="1.2">
-<MHTML>
    <ListTemplateId>108</ListTemplateId>
  </MHTML>
-<StructureAndProperties>
-<FirstOrderObject>
-<SubStructure>
-<SubObject CID="000003.htm" ContainerPath="Tom Olman-10.repl/Tom Olman-42.repl">
-<Properties>
    <ObjectType>10006</ObjectType>
    <ObjectName>Tom Olman-42.repl</ObjectName>
    <ObjectURL>http://shpt.ad2010.local/sites/teamblog/
      List s/EDiscovery Discussion/Steganography in the
      forensics world/42_0.000</ObjectURL>
    <Stat fs_atime="1331729951" fs_ctime="1331729951"
      fs_dev="11" fs_inode="45" fs_mode="32768" fs_m-
      time="1331729951" fs_nlink="1" owner_id="Tom
      Olman" size="1503" />
    <ObjectHash md5=""shat="" />
    <ObjectDocId>01CD2BCDE282314C3A46CD0843B3-
      8A39D4B8B36FD0 DA0056E5D41268B3FA32B4</
      ObjectDocId>
    <MetadataCID>000004.html</MetadataCID>
  </Properties>
  </SubObject>
  </SubStructure>
  </FirstOrderObject>
  </StructureAndProperties>
  </StoredIQMHTMLStructure>
```

Note with respect to the structure descriptor for MHT t1, that the ObjectDocId carries the unique identifier for reply 740 allowing MHT t1 to be correlated with MHT t0 that was previously created and that comprises post 710 and replies 720 and 730.

Thus, at some point a collection run may begin. MHT t0 and MHT t1 may include header information by which they may be identified as being created by embodiments of a preservation solution. For example, such a header may be:
MIME-Version: 1.0
Subject:
From: StoredIQ Intelligent Information Management
X-MHTML-Produced-By: StoredIQ When such a header is located, then, the structure descriptor XML of MHT t0 and MHT t1 may be accessed. Any MHT that has an ObjectDocId which is either the same as or a super-sequence/sub-sequence of other ObjectDocIds that have been collated into a group, will be added to the group. Thus MHT t0 and MHT t1 may be grouped together as the structure descriptor XML of MHT t1 comprises ObjectDocIds that are the same as or a super-sequence/sub-sequence of ObjectDocIds in the structure descriptor XML of MHT t0 and vice versa.

A review archive can then be formed from MHT t0 and t1 using the Content-IDs associated with each of the MHTs. It will be remembered from the above discussion that the structure descriptor XML for each MHT also contains details about how to reach into each MHT to pull out the relevant content in HTML form and any associated metadata, also in HTML form. For example, the HTML for a particular object is identified using a Content-ID for the MHT such as:
<SubObject CID="000003.htm">
Where the corresponding object's metadata HTML is identified with another Content-ID into the MHT as:
<MetadataCID>000004.html</MetadataCID>

Hence, using the ObjectDocId of the structure descriptor XML for MHT t0 and MHT t1 to determine position in the thread hierarchy, and the Content-IDs of the structure descriptors XML for MHT t0 and MHT t1 to pull out the HTML associated with the objects from MHT t0 and MHT t1, a single, self-referencing review MHT may be created from MHT t0 and MHT t1 using the same MHT creation process that was followed by the embodiment of the preservation solution. This MHT may then be rendered by an application for a user.

Figure 8C:
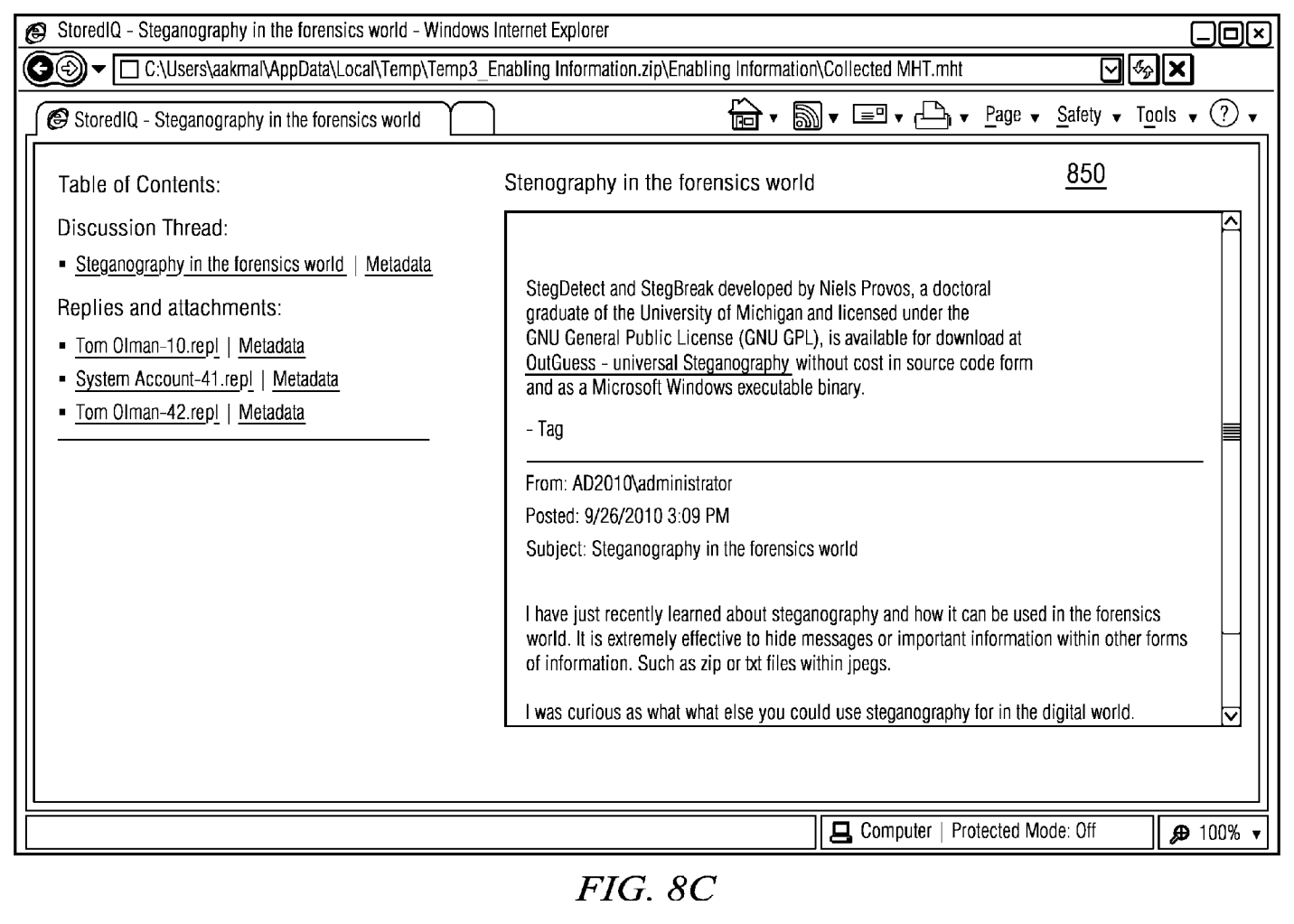

FIGS. 8A-8C depicts one embodiment of an interface presented by the review MHT created from MHT t0 and t1 when the review MHT is rendered by a web browser. Notice here with respect to FIG. 8A that the table of contents frame 802 comprises link 810 to post 710 (and link 812 to metadata associated with post 710), link 820 to reply 720 (and link 822 to metadata associated with reply 720), link 830 to reply 730 (and link 832 to metadata associated with reply 730) and link 840 to reply 740 (and link 842 to metadata associated with reply 740). Thus, by interacting with the links 810, 812, 820, 822, 830, 832, 840 and 842 associated data on those objects may be displayed in presentation frame 850. In the interface depicted in FIG. 8A for example, the entire post is displayed, while in FIG. 8B, a user has clicked on link 812, thus rendering the metadata for post 710 in presentation frame 850 and in FIG. 8C a user has clicked on link 820, thus rendering the content of the reply 720.

A skilled artisan will recognize that in addition to embodiments shown and described with reference to the drawings disclosed herein, other embodiments are possible. In particular, it is possible to compose components/subsystems described herein in various ways, for example, disabling certain of the functions above. One embodiment described herein can address these functions substantially simultaneously. However, it should be understood that each of the subsystems (and each of the functions) are independent of one another and embodiments of the invention can comprise a number of subsystems running any subset of these functions or others. Moreover, it should be noted that each of the functions above and their corresponding subsystems and/or software implementations need not reside on a single computer. They can be distributed across multiple distinct computers according to embodiments of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A preservation system, comprising:
a preservation computer coupled to a collaborative content server over a network, the preservation computer comprising:
   a processor,
   a data store, and
   a preservation module configured to:
     determine a first set of objects of a collaborative content object on the collaborative content server at a first time, wherein the objects of the collaborative content object are arranged in a hierarchy and related by a hierarchical relationship;
     create a first archive comprising the first set of objects of the collaborative content object and store the first archive in the data store, wherein the data store includes a plurality of archives corresponding to a plurality of different collaborative content objects;
     determine a second set of objects of the collaborative content object on the collaborative content server at a second time;
     determine that the second set of objects includes one or more changed objects that have changed relative to the first set of objects between the first time and the second time; and
     create a second archive comprising the one or more changed objects that have changed between the first time and the second time and a structure descriptor that includes data indicating the hierarchical relationship between the one or more objects that have changed in the second archive and the first set of objects in the first archive and store the second archive on the data store, wherein the second archive lacks objects from the first set of objects that remain unchanged at the second time; and
   a collection module configured to:
     identify the first archive and second archive among the plurality of archives in the data store as relating to the same collaborative content object based on the structure descriptor and group the first archive and the second archive; and
     create a review archive for the collaborative content object from the first archive and the second archive, wherein the review archive comprises the first set of objects and the one or more changed objects structured according to the hierarchical relationship indicated by the structure descriptor.

2. The system of claim 1, wherein each of the first archive, the second archive and the review archive are in a Multipurpose Internet Mail Extension Hyper-Text Markup Language (MHTML) format.

3. The system of claim 1, wherein the first archive includes metadata on the first set of objects, the second archive includes metadata on the one or more changed objects and the review archive includes the metadata on the first set of objects and the metadata on the one or more changed objects.

4. The system of claim 1, wherein each of the first archive, the second archive and the review archive are configured to present a table of contents frame and a presentation frame when rendered, where the table of contents frame comprises a link to each of the first set of objects and the one or more changed objects.

5. The system of claim 1, wherein the collaborative content object is one of a SharePoint object, a Jive object, and a NewsGator object.

6. A method for incrementally preserving collaborative content, comprising:
   determining, via a processor, a first set of objects of a collaborative content object at a first time, wherein the objects of the collaborative content object are arranged in a hierarchy and related by a hierarchical relationship;
   creating, via a processor, a first archive comprising the first set of objects of the collaborative content object and storing the first archive in a data store, wherein the data store includes a plurality of archives corresponding to a plurality of different collaborative content objects;
   determining, via a processor, a second set of objects of the collaborative content object at a second time;
   determining, via a processor, that the second set of objects includes one or more changed objects relative to the first set of objects that have changed between the first time and the second time;
   creating, via a processor, a second archive comprising the one or more changed objects that have changed between the first time and the second time and a structure descriptor that includes data indicating the hierarchical relationship between the one or more objects in the second archive that have changed and the first set of objects in the first archive and storing the second archive on the data store, wherein the second archive lacks objects from the first set of objects that remain unchanged at the second time;
   identifying, via a processor, the first archive and second archive among the plurality of archives in the data store as relating to the same collaborative content object based on the structure descriptor and grouping the first archive and the second archive; and
   creating, via a processor, a review archive for the collaborative content object from the first archive and the second archive, wherein the review archive comprises the first set of objects and the one or more changed objects structured according to the hierarchical relationship indicated by the structure descriptor.

7. The method of claim 6, wherein each of the first archive, the second archive and the review archive are in a Multipurpose Internet Mail Extension Hyper-Text Markup Language (MHTML) format.

8. The method of claim 6, wherein the first archive includes metadata on the first set of objects, the second archive includes metadata on the one or more changed objects and the review archive includes the metadata on the first set of objects and the metadata on the one or more changed objects.

9. The method of claim 6, wherein each of the first archive, the second archive and the review archive are configured to present a table of contents frame and a presentation frame when rendered, where the table of contents frame comprises a link to each of the first set of objects and the one or more changed objects.

10. The method of claim 6, wherein the collaborative content object is one of a SharePoint object, a Jive object, and a NewsGator object.

11. A non-transitory computer readable medium comprising instructions for incrementally preserving collaborative content, wherein the instructions are executable by a processor for:

determining a first set of objects of a collaborative content object at a first time, wherein the objects of the collaborative content object are arranged in a hierarchy and related by a hierarchical relationship;

creating a first archive comprising the first set of objects of the collaborative content object and storing the first archive in a data store, wherein the data store includes a plurality of archives corresponding to a plurality of different collaborative content objects;

determining a second set of objects of the collaborative content object at a second time;

determining that the second set of objects includes one or more changed objects that have changed relative to the first set of objects between the first time and the second time;

creating a second archive comprising the one or more changed objects that have changed between the first time and the second time and a structure descriptor that includes data indicating the hierarchical relationship between the one or more objects in the second archive that have changed and the first set of objects in the first archive and storing the second archive on the data store, wherein the second archive lacks objects from the first set of objects that remain unchanged at the second time;

identifying the first archive and second archive among the plurality of archives in the data store as relating to the same collaborative content object based on the structure descriptor and grouping the first archive and the second archive; and creating a review archive for the collaborative content object from the first archive and the second archive, wherein the review archive comprises the first set of objects and the one or more changed objects structured according to the hierarchical relationship indicated by the structure descriptor.

12. The non-transitory computer readable medium of claim 11, wherein each of the first archive, the second archive and the review archive are in a Multipurpose Internet Mail Extension Hyper-Text Markup Language (MHTML) format.

13. The non-transitory computer readable medium of claim 11, wherein the first archive includes metadata on the first set of objects, the second archive includes metadata on the one or more changed objects and the review archive includes the metadata on the first set of objects and the metadata on the one or more changed objects.

14. The non-transitory computer readable medium of claim 11, wherein each of the first archive, the second archive and the review archive are configured to present a table of contents frame and a presentation frame when rendered, where the table of contents frame comprises a link to each of the first set of objects and the one or more changed objects.

15. The non-transitory computer readable medium of claim 11, wherein the collaborative content object is one of a SharePoint object, a Jive object, and a NewsGator object.

16. A method for incrementally preserving collaborative content, comprising:

determining, via a processor, a first set of objects of a collaborative content object at a first time, wherein the objects of the collaborative content object are related by a hierarchical relationship and the collaborative content object is one of a SharePoint object, a Jive object, and a NewsGator object;

creating, via a processor, a first archive comprising the first set of objects of the collaborative content object and storing the first archive in a data store, wherein the data store includes a plurality of archives corresponding to a plurality of different collaborative content objects;

determining, via a processor, a second set of objects of the collaborative content object at a second time;

determining, via a processor, that the second set of objects includes one or more changed objects that have changed between the first time and the second time;

creating, via a processor, a second archive comprising the one or more changed objects that have changed between the first time and the second time and a structure descriptor that includes data indicating the hierarchical relationship between the one or more objects in the second archive that have changed and the first set of objects in the first archive and storing the second archive on the data store;

identifying, via a processor, the first archive and second archive among the plurality of archives in the data store as relating to the same collaborative content object based on the structure descriptor and grouping the first archive and the second archive; and creating, via a processor, a review archive for the collaborative content object from the first archive and the second archive, wherein the review archive comprises the first set of objects and the one or more changed objects.

* * * * *